United States Patent
Kim et al.

(10) Patent No.: US 11,089,638 B2
(45) Date of Patent: Aug. 10, 2021

(54) MOBILE DEVICE AND ELECTRONIC DEVICE FOR WIRELESS COMMUNICATION, AND OPERATION METHODS THEREOF

(71) Applicant: Samsung Electronics Co., Ltd., Suwon-si (KR)

(72) Inventors: Jinho Kim, Suwon-si (KR); Deoknam Kim, Suwon-si (KR); Geunyoung Yu, Suwon-si (KR); Sukun Yoon, Suwon-si (KR); Minju Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 54 days.

(21) Appl. No.: 16/712,344

(22) Filed: Dec. 12, 2019

(65) Prior Publication Data
US 2020/0196358 A1 Jun. 18, 2020

(30) Foreign Application Priority Data
Dec. 12, 2018 (KR) .......................... 10-2018-0160344

(51) Int. Cl.
*H04W 76/10* (2018.01)
*H04W 48/20* (2009.01)
(Continued)

(52) U.S. Cl.
CPC .......... *H04W 76/10* (2018.02); *H04W 48/08* (2013.01); *H04W 48/20* (2013.01); *H04W 84/12* (2013.01)

(58) Field of Classification Search
None
See application file for complete search history.

(56) References Cited

U.S. PATENT DOCUMENTS 9,572,183 B2 * 2/2017 Minamino ............ H04W 48/16
10,477,389 B2 11/2019 Lee et al.
(Continued)

FOREIGN PATENT DOCUMENTS

| KR | 10-1050601 | 7/2011 |
| KR | 10-2016-0112560 | 9/2016 |
| WO | 2015/073519 | 5/2015 |

OTHER PUBLICATIONS

International Search Report and Written Opinion of the International Searching Authority dated Mar. 19, 2020 in International Patent Application No. PCT/KR2019/017597.

*Primary Examiner* — Hong S Cho
(74) *Attorney, Agent, or Firm* — Staas & Halsey LLP

(57) ABSTRACT

A mobile device, electronic device, and operation methods thereof are provided. The mobile device includes a communication interface; a memory storing one or more instructions; and a processor configured to execute the one or more instructions stored in the memory to: connect through the communication interface to an electronic device to be wirelessly connected to an access point (AP), obtain an AP list including one or more APs to each of which the mobile device has a history of being connected, identify one or more APs selected from the AP list having the connection history as candidate APs and create a candidate AP list including information about the identified one or more candidate APs, and transmit, to the electronic device, the candidate AP list and information about a home AP indicating an AP to which the mobile device is currently connected.

20 Claims, 17 Drawing Sheets

(51) Int. Cl.
*H04W 8/00* (2009.01)
*H04W 48/08* (2009.01)
*H04W 84/12* (2009.01)

(56) References Cited

U.S. PATENT DOCUMENTS

| | | | |
|---|---|---|---|
| 2013/0252547 A1* | 9/2013 | Cho | ........................ H04W 4/80 |
| | | | 455/41.1 |
| 2015/0110087 A1 | 4/2015 | Salkintzis et al. | |
| 2016/0242025 A1 | 8/2016 | Aliyar | |
| 2017/0118276 A1 | 4/2017 | Kim et al. | |

* cited by examiner

FIG. 10A

SCANNED AP LIST (1010)

| SSID | CHANNEL | BSSID | SIGNAL QUALITY INFORMATION |
|---|---|---|---|
| AP#1_2.4 | 6 (2.4GHz) | 2c:30:33:cf:03:7d | ... |
| AP#1_5 | 149 (5GHz) | 2c:30:33:cf:03:7e | ... |
| AP#2 | 11 (2.4GHz) | 00:08:9f:94:81:54 | ... |
| AP#3 | 5 (2.4 GHz) | 60:38:e0:cc:a1:99 | ... |
| AP#4 | 8 (2.4 GHz) | 4c:60:08:cf:05:4d | ... |
| AP#5 | 153 (5GHz) | 5c:40:08:94:81:3e | ... |
| AP#6 | 10 (2.4GHz) | 00:50:48:54:9f:45 | ... |
| ... | ... | ... | ... |
| AP#n | ... | ... | ... |

FIG. 10B

AP LIST HAVING MOBILE CONNECTION HISTORY (1020)

| SSID | PASSWORD | CHANNEL | BSSID |
|---|---|---|---|
| AP#1_2.4 | 11111111 | 6 (2.4GHz) | 2c:30:33:cf:03:7d |
| AP#1_5 | 22222222 | 149 (5GHz) | 2c:30:33:cf:03:7e |
| AP#2 | 33333333 | 11 (2.4GHz) | 00:08:9f:94:81:54 |
| AP#3 | 44444444 | 5 (2.4GHz) | 60:38:e0:cc:a1:99 |
| AP#10 | 55555555 | 161 (5GHz) | 78:54:2e:49:16:c8 |

FIG. 10C

CANDIDATE AP LIST (1030)

| SSID | PASSWORD | CHANNEL | BSSID | HOME AP | CANDIDATE AP | SIGNAL QUALITY INFORMATION |
|---|---|---|---|---|---|---|
| AP#1_2.4 | 11111111 | 6 (2.4GHz) | 2c:30:33:cf:03:7d | O | X | ... |
| AP#1_5 | 22222222 | 149 (5GHz) | 2c:30:33:cf:03:7e | X | O | ... |
| AP#2 | 33333333 | 11 (2.4GHz) | 00:08:9f:94:81:54 | X | O | ... |
| AP#3 | 44444444 | 5 (2.4GHz) | 60:38:e0:cc:a1:99 | X | O | |

1031, 1032, 1033, 1034, 1035, 1036, 1037

← HOME AP

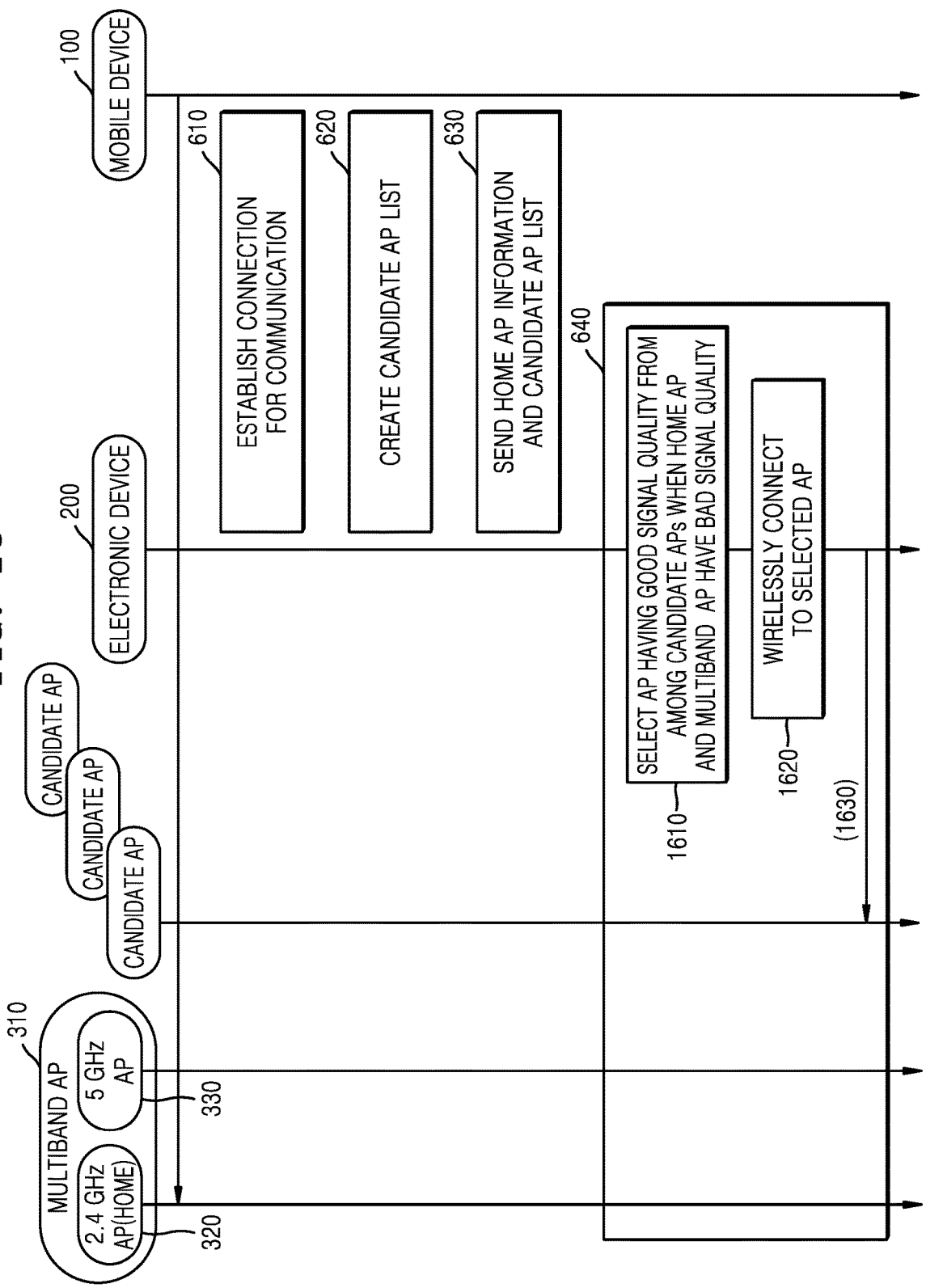

MOBILE DEVICE AND ELECTRONIC DEVICE FOR WIRELESS COMMUNICATION, AND OPERATION METHODS THEREOF

CROSS-REFERENCE TO RELATED APPLICATION

This application is based on and claims priority under Korean Patent Application No. 10-2018-0160344, filed on Dec. 12, 2018, in the Korean Intellectual Property Office, the disclosure of which is incorporated by reference herein in its entirety.

BACKGROUND

1. Field

Various embodiments of the disclosure relate to a mobile device, an electronic device, and operation methods thereof, and more particularly, to a mobile device and electronic device for Wi-Fi connection, and operation methods thereof.

2. Description of the Related Art

Most recent access point (AP) products are equipped with a multiband scheme by which a single AP is able to broadcast both 2.4 GHz and 5 GHz band wireless fidelity (Wi-Fi) signals. For Wi-Fi communication, a basic service set identifier (BSSID) indicating a medium access control (MAC) address of an AP is usually used for communication between terminals. An AP supporting multiband allocates BSSIDs for different frequencies, and terminals may make connections by distinguishing frequency bands by different BSSIDs.

In general, as the 2.4 GHz wireless band uses low frequencies with long wavelengths, it has better reflection and refraction capabilities for avoiding obstacles, and thus has a longer reception range and provides wider coverage as compared with the 5 GHz band. However, the 2.4 GHz wireless band often has a problem with rapidly decreasing speed due to severe signal interference among many nearby APs or smart devices that use the same frequency. On the contrary, although the 5 GHz band has decreasing reception rate when there is an obstacle such as a wall blocking a signal path because the 5 GHz band is vulnerable to diffraction and reflection as compared with the 2.4 GHz band, the 5 GHz band has better signal reception on a straight path without an obstacle and maintains a faster and more reliable radio speed because of less signal interference than in the 2.4 GHz band. To sum up, the 2.4 GHz and the 5 GHz bands each have pros and cons according to their attributes, and a frequency band having the best performance may be changed depending on the location and type of the terminal.

Generally, to perform Wi-Fi connection for a device, the user needs to access a Wi-Fi connection-related menu provided by the device to scan for nearby APs, select an AP to be connected from an AP list output on the device, and enter a preset password for the AP. For smart home appliances without a display, the user's manipulation for AP selection or entering a password is difficult, so the Wi-Fi connection is automatically performed by using an external device such as a mobile device. Furthermore, to solve the discomfort of remote control input, some smart televisions also include a function to easily perform Wi-Fi connection through a mobile device. When the mobile device reads and sends information about connected Wi-Fi (AP name, password information, etc.) to the home appliance, the home appliance is able to perform automatic Wi-Fi connection based on the Wi-Fi information sent from the mobile device without a procedure in which the user selects an AP and enters a password.

SUMMARY

According to an embodiment of the disclosure, a mobile device includes a communication interface; a memory storing one or more instructions; and a processor configured to execute the one or more instructions stored in the memory to: connect through the communication interface to an electronic device to be wirelessly connected to an access point (AP), obtain an AP list including one or more APs to each of which the mobile device has a history of being connected, identify one or more APs selected from the AP list having the connection history as candidate APs and create a candidate AP list including information about the identified one or more candidate APs, and transmit, to the electronic device, the candidate AP list and information about a home AP indicating an AP to which the mobile device is currently connected.

The processor may be further configured to execute the one or more instructions to, when creating the candidate AP list, receive, from the electronic device, a list of scanned APs including one or more APs scanned by the electronic device performing wireless fidelity (Wi-Fi) channel scanning; and match the AP list having the connection history with the list of scanned APs and identify one or more matched APs as candidate APs.

The processor may be further configured to execute the one or more instructions to, when creating the list of candidate APs, create a list of scanned APs including one or more APs scanned by performing Wi-Fi channel scanning; and match the AP list having the connection history with the list of scanned APs and identify one or more matched APs as candidate APs.

The processor may be further configured to execute the one or more instructions to identify, from among the AP list having the connection history, one or more APs having equal or higher wireless communication quality than a threshold as candidate APs, and create a candidate AP list including information about the identified one or more candidate APs.

The processor may be further configured to execute the one or more instructions to select the one or more candidate APs from the candidate AP list according to predefined priorities, and create an adjusted candidate AP list including the one or more selected candidate APs.

The list of candidate APs and the information about a home AP transmitted to the electronic device may include a basic service set identifier (BSSID); a channel number, and a password for each AP; and information about whether the AP is a home AP.

The list of candidate APs and the information about a home AP transmitted to the electronic device further include information about wireless communication quality of each AP.

According to another embodiment of the disclosure, an electronic device includes a communication interface; a memory storing one or more instructions; and a processor configured to execute the one or more instructions stored in the memory to: connect to a mobile device through the communication interface, receive, from the mobile device, a candidate access point (AP) list including information about one or more candidate APs selected from among one or more APs to each of which the mobile device has a history of being connected and information about a home AP indicating an AP currently connected to the mobile device, select an AP to which the electronic device is to be wirelessly connected, based on the list of candidate APs and the home AP information received from the mobile device, and wirelessly connect to the selected AP.

The processor may be further configured to execute the one or more instructions to create a list of scanned APs including one or more APs scanned by performing Wi-Fi channel scanning and transmit the list of scanned APs to the mobile device, and the candidate AP list received from the mobile device comprises one or more APs as candidate APs, matched between one or more APs to each of which the mobile device has a history of being connected and the list of scanned APs.

The candidate AP list received from the mobile device may include one or more APs as candidate APs, matched between one or more APs to each of which the mobile device has a history of being connected and one or more APs scanned by the mobile device.

The candidate AP list and the information about a home AP received from the mobile device may include a basic service set identifier (BSSID); a channel number, and a password for each AP; and information about whether the AP is a home AP.

The processor may be further configured to execute the one or more instructions to, when selecting an AP to which the electronic device is to be wirelessly connected, based on the candidate AP list and the home AP information received from the mobile device, identify the home AP as the AP to be wirelessly connected when the home AP has a 5 GHz band and equal or higher wireless communication quality than a threshold.

The processor may be further configured to execute the one or more instructions to, when selecting an AP to which the electronic device is to be wirelessly connected, based on the candidate AP list and the home AP information received from the mobile device, identify, from among the candidate AP list, a candidate AP having a 5 GHz band of the home AP as an AP to be wirelessly connected, when the home AP is in a 2.4 GHz band and corresponds to a multiband AP.

The processor may be further configured to execute the one or more instructions to compare BSSIDs of one or more candidate APs included in the candidate AP list with a BSSID of the home AP, and when there is a match in a certain number of bytes or more, identify that the home AP is the multiband AP.

The processor may be further configured to execute the one or more instructions to, when selecting an AP to which the electronic device is to be wirelessly connected, based on the candidate AP list and the home AP information received from the mobile device, select a candidate AP from among the candidate AP list as the AP to be wirelessly connected, based on wireless communication quality information, when the home AP or the candidate AP having the 5 GHz band of the home AP has lower wireless communication quality than a threshold.

According to another embodiment of the disclosure, an operation method of a mobile device includes connecting to an electronic device to be wirelessly connected to an access point (AP); obtaining an AP list including one or more APs to each of which the mobile device has a history of being connected; determining, as candidate APs, one or more APs selected from among the AP list having the connection history, and creating a candidate AP list including information about the determined one or more candidate APs; and transmitting, to the electronic device, the created candidate AP list and information about a home AP indicating an AP to which the mobile device is currently connected.

According to another embodiment of the disclosure, an operation method of an electronic device includes connecting with a mobile device through a communication interface; receiving, from the mobile device, a candidate AP list including information about one or more candidate APs selected from among one or more APs to each of which the mobile device has a history of being connected and information about a home AP indicating an AP currently connected to the mobile device; selecting an AP to which the electronic device is be wirelessly connected, based on the candidate AP list and the home AP information received from the mobile device; and wirelessly connecting to the selected AP.

According to another embodiment of the disclosure, a computer program product including a computer-readable recording medium having a program stored thereon is provided. The program performs an operation method of a mobile device including: connecting to an electronic device to be wirelessly connected to an access point (AP); obtaining an AP list including one or more APs to each of which the mobile device has a history of being connected; determining, as candidate APs, one or more APs selected from among the AP list having the connection history, and creating a candidate AP list including information about the determined one or more candidate APs; and transmitting, to the electronic device, the created candidate AP list and information about a home AP indicating an AP to which the mobile device is currently connected.

Additional aspects will be set forth in part in the description which follows and, in part, will be apparent from the description, or may be learned by practice of the presented embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10A shows an example of a list of scanned APs created by an electronic device;

FIG. 10B shows an example of a list of APs having mobile connection history;

FIG. 10C shows an example of a list of candidate APs, according to an embodiment of the disclosure;

FIG. 16 shows details of an operation of an electronic device of selecting and connecting to a candidate AP to be wirelessly connected, according to another embodiment of the disclosure.

DETAILED DESCRIPTION

Figure 1A:
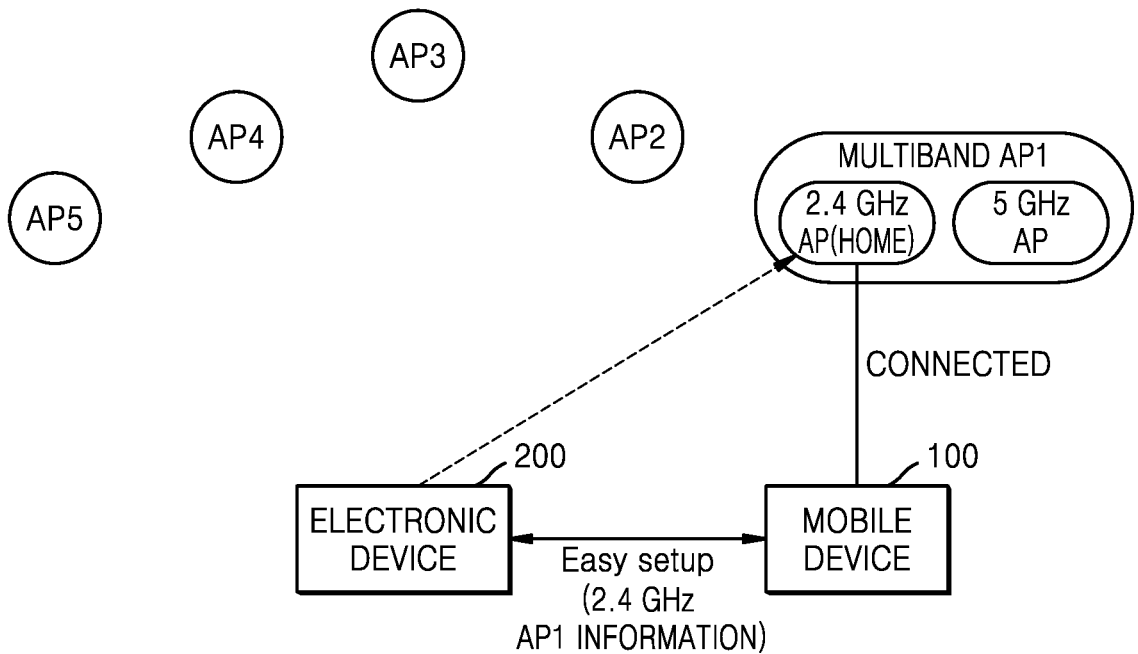
FIG. 1A is a reference diagram for explaining a system in which an electronic device wirelessly connects to an access point (AP) by using a mobile device.

Terms as used herein will be described before detailed description of embodiments of the disclosure.

The terms are selected as common terms widely used now, taking into account principles of the present disclosure, which may however depend on intentions of ordinary people in the art, judicial precedents, emergence of new technologies, and the like. Some terms as herein used are selected at the applicant's discretion, in which case, description thereof will be explained later in detail. Therefore, the terms should be defined based on their meanings and descriptions throughout the specification of the present disclosure.

The term "include (or including)" or "comprise (or comprising)" is inclusive or open-ended and does not exclude additional, unrecited elements or method steps. "Unit", "module", "block", etc. used herein each represent a unit for handling at least one function or operation, and may be implemented in hardware, software, or a combination thereof.

Throughout the disclosure, the expression "at least one of a, b or c" indicates only a, only b, only c, both a and b, both a and c, both b and c, all of a, b, and c, or variations thereof.

Embodiments of the disclosure will now be described in detail with reference to accompanying drawings to be readily practiced by an ordinary skill in the art. However, the disclosure may be implemented in many different forms, and not limited to the embodiments of the disclosure as will be discussed herein. In the drawings, parts unrelated to the description are omitted for clarity, and like numerals refer to like elements throughout the specification.

The term 'user' as used herein refers to a person who controls functions or operations of a mobile device or an electronic device, including a viewer, an administrator, or an installation engineer.

Embodiments of the disclosure provide a mobile device, electronic device, and operation method thereof, which allows selection of a best access point (AP) by taking into account environments around the electronic device for automatic wireless fidelity (Wi-Fi) connection of the electronic device.

FIG. 1A is a reference diagram for explaining a system in which an electronic device makes wireless connection to an access point (AP) by using a mobile device.

Referring to FIG. 1A, the system includes a mobile device 100, an electronic device 200, and access points (APs) AP1, AP2, AP3, AP4, and AP5.

The mobile device 100 may include any type of user equipment (or terminal) that includes a processor and a communication module to communicate with another external device. For example, the mobile device 100 may include a portable device such as a mobile phone, a notebook, ear pieces, headphones, a speaker, etc.

The electronic device 200 may include any device that includes a processor and a communication module to communicate with another external device. For example, the electronic device 200 may include a home appliance such as a television, a speaker, a refrigerator, a washer, or the like.

Referring to FIG. 1A, the mobile device 100 is currently Wi-Fi connected to the AP1 serving as a 2.4 GHz AP among the APs. Wi-Fi stands for wireless fidelity, a technology to enable wireless broadband Internet access of devices using a local area network (LAN) without a dedicated line or telephone wire. Wi-Fi communication refers to communication between an AP that basically forwards wireless signals and user equipment that receives a service for the user. The Wi-Fi communication uses 2.4 GHz or 5 GHz band.

The user is able to directly control the electronic device 200 to make Wi-Fi connection to one of the APs, or the electronic device 200 may use the mobile device 100 for Wi-Fi connection.

As for normal Wi-Fi automatic connection through the mobile device 100, the mobile device 100 sends information about Wi-Fi connection the mobile device 100 currently has, i.e., information about the AP1 in this example, to the electronic device 200. Hence, although the electronic device 200 has the chance to select an AP with better signal quality from among other nearby APs, AP2, AP3, AP4, and AP5, the electronic device 200 may be wirelessly connected only to the AP1 to which the mobile device 100 is connected because the electronic device 200 receives no information about other nearby APs but the information about the AP1 from the mobile device 100. For example, when the mobile device 100 is connected to the 2.4 GHz Wi-Fi band, the mobile device 100 provides the electronic device 200 with information about the 2.4 GHz AP to which the mobile device 100 is connected even when the AP is the multiband AP that also supports the 5 GHz band, thereby restricting the electronic device 200 to making connection with the 2.4 GHz AP.

As such, conventionally, a method is provided to send just the information about the Wi-Fi connected to the mobile device 100 without considering a Wi-Fi connection environment of the electronic device 200 that makes actual Wi-Fi connection. When performing to make automatic Wi-Fi connection through a mobile device while the mobile device is connected at a radio frequency in the 2.4 GHz band under a bad wireless environment, the electronic device 200, having received the Wi-Fi information, also has the limited choice to connect to the bad Wi-Fi environment.

Figure 1B:
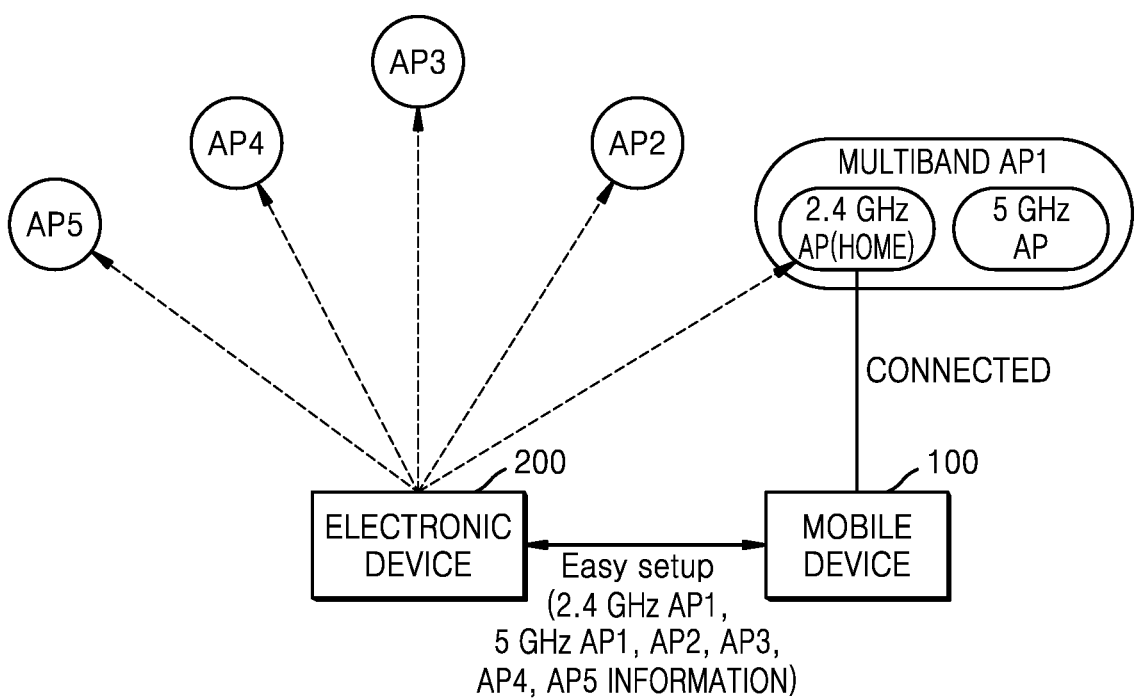
FIG. 1B is a reference diagram for explaining a system in which an electronic device wirelessly connects to an AP by using a mobile device.

FIG. 1B is a reference diagram for explaining a system in which an electronic device makes wireless connection to an AP by using a mobile device.

Referring to FIG. 1B, the mobile device 100 is currently Wi-Fi connected to the AP1 serving as the 2.4 GHz AP among the APs.

For Wi-Fi automatic connection through the mobile device 100 as shown in FIG. 1A, the mobile device 100 sends information about the Wi-Fi that the mobile device 100 is connected to, i.e., information about the AP1 serving as the 2.4 GHz AP, but in the example of FIG. 1B, the mobile device 100 may provide not only the information about the 2.4 GHz AP it is connected to but also information about another AP included in the multiband AP1, i.e., the 5 GHz AP and information about one or more nearby APs, i.e., AP2, AP3, AP4, and AP5.

In an embodiment of the disclosure, when the mobile device 100 collects information about APs available for wireless connection to provide to the electronic device 200, the mobile device 100 may use the information about APs each having a history of being connected to the mobile device 100.

Furthermore, in an embodiment of the disclosure, the mobile device 100 may use a list of APs scanned by the electronic device 200 or a list of APs scanned by the mobile device 100.

Moreover, in an embodiment of the disclosure, the mobile device 100 may provide all or some of the collected information about the APs to the electronic device 200, or provide the collected information about the APs by placing the APs in an order.

Accordingly, the electronic device 200 may select an AP with best performance from among not only the 2.4 GHz AP of AP1 to which the mobile device 100 is currently connected but also the 5 GHz AP of AP1 and other nearby APs, i.e., AP2, AP3, AP4, and AP5. For example, when a Wi-Fi band of the AP1 currently connected to the mobile device 100 is the 2.4 GHz band and the AP1 supports multiband, the mobile device 100 may make wireless connection by using the 5 GHz band of the AP1.

Figure 2:
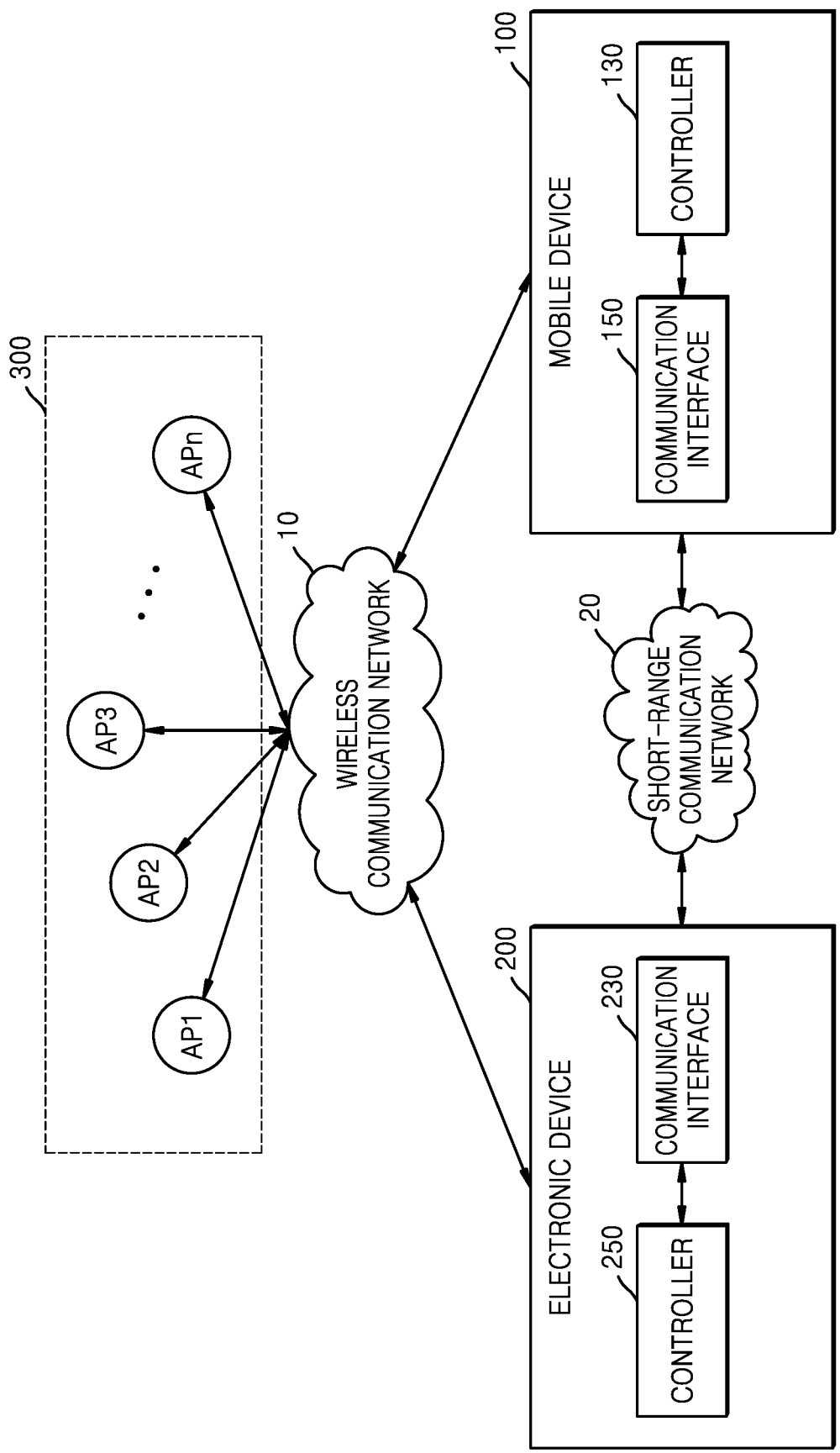
FIG. 2 is a schematic block diagram of a system including a mobile device and an electronic device, according to an embodiment of the disclosure.

FIG. 2 is a schematic block diagram of a system including a mobile device and an electronic device, according to an embodiment of the disclosure.

Referring to FIG. 2, the system may include the mobile device 100, the electronic device 200, an AP 300, a short-range communication network 20 for communication between the mobile device 100 and the electronic device 200, and a wireless communication network 10 for communication between the mobile device 100 or the electronic device 200 and the AP 300.

The AP 300 refers to a wireless AP (WAP), a device to enable wireless devices to be connected to a wired device based on a related standard using Wi-Fi in a computer network. The WAP is commonly connected to a router that passes a wired network and may relay data between a wireless device such as a computer, a printer, or the like and a wired device in the network.

The wireless communication network 10 uses Wi-Fi. Again, Wi-Fi stands for wireless fidelity, a technology to enable wireless broadband Internet access of devices using a LAN (Local Area Network) without a dedicated line or telephone wire. Wi-Fi communication refers to communication between an AP that basically serves as forwarding wireless signals and user equipment or a terminal that receives a service. The Wi-Fi communication uses 2.4 GHz or 5 GHz band.

The short-range communication network 20 enables communication between the mobile device 100 and the electronic device 200 in a short range, and may use e.g., Bluetooth (BT), Bluetooth low energy (BLE), soft AP, near field communication (NFC), Wi-Fi direct, etc. The soft AP stands for software enabled AP, which refers to software enabling not a router but a computer to serve as a wireless AP.

The mobile device 100 includes a controller 130 and a communication interface 150.

The communication interface 150 includes multiple communication modules for Wi-Fi connection with an AP, communication with a BT device, or Wi-Fi peer-to-peer (P2P) communication with a peer device.

For example, the communication interface 150 may include a Wi-Fi module for wireless communication with the AP 300 over the wireless communication network 10, and a short-range communication module for short-range wireless communication with the electronic device 200 over the short-range communication network 20.

The mobile device 100 may be connected to one of APs over the wireless communication network 10. For example, the mobile device 100 may be connected to the AP1. The mobile device 100 connected to the AP1 may have a password stored for connection to the AP1. The mobile device 100 may later terminate the connection with the AP1 and connect to the AP2, even in which case the mobile device 100 may still have the information about the AP1 that has ever been connected to the mobile device 100. The mobile device 100 may store information about one or more APs to each of which the mobile device 100 has a history of being connected. The information about one or more APs having ever been connected may include a basic service set identifier (BSSID), a channel number, a password, etc., for each AP.

The controller 130 may include one or more processors to control the communication interface 150.

In an embodiment of the disclosure, the controller 130 may be connected through the communication interface 150 to the electronic device 200 to make wireless connection to an AP, obtain a list of one or more APs to each of which the mobile device has a history of being connected, determine one or more APs from the list of APs having ever been connected as candidate APs, create a list of candidate APs including information about the one or more candidate APs, transmit the list of candidate APs and home AP information including information about a home AP currently connected to the mobile device 100 to the electronic device 200. The home AP information may be included in the list of candidate APs.

In this way, the mobile device 100 provides the electronic device 200 with not only the information about the home AP currently connected to the mobile device 100 but also information about candidate APs selected from among the APs having ever been connected to the mobile device 100, and the electronic device 200 may use the received information about the APs to select an AP that may provide the best performance for the electronic device 200.

In an embodiment of the disclosure, to create the list of candidate APs, the controller 130 may receive from the electronic device 200 a list of one or more APs scanned by the electronic device 200 performing Wi-Fi channel scanning, and determine candidate APs to be one or more APs matched between the list of APs each having a connection history and the list of scanned APs.

As such, as the mobile device 100 determines the candidate APs by considering not only the APs each having ever been connected to the mobile device 100 but also information about the APs scanned by the electronic device 200, the mobile device 100 may reflect information about APs that suit the network environment of the electronic device 200 onto the list of candidate APs to be provided to the electronic device 200.

In an embodiment of the disclosure, to create the list of candidate APs, the controller 130 may create a list of one or more APs scanned by performing Wi-Fi channel scanning, and determine candidate APs to be one or more APs matched between the list of APs each having a connection history and the list of scanned APs.

For example, under a condition where the mobile device 100 is unable to receive the list of scanned APs from the electronic device 200, the mobile device 100 may determine candidate APs by taking into account not only the information about APs each having ever been connected to the mobile device 100 but also the information about APs scanned by the mobile device 100.

In an embodiment of the disclosure, to create the list of candidate APs, the controller 130 may determine candidate APs to be one or more APs among the list of APs having the connection history, which have higher wireless communication quality than a threshold, and create the list of candidate APs to include information about the determined one or more candidate APs.

As the mobile device 100 determines not all but some of the APs having ever been connected to the mobile device 100 that have higher wireless communication quality than the threshold, an amount of data transmission of the list of candidate APs to the electronic device 200 may be reduced, enabling the electronic device 200 to effectively select an AP for wireless communication from among the APs having the higher wireless communication quality than the threshold.

In an embodiment of the disclosure, the controller 130 may place the one or more candidate APs on the list of candidate APs according to certain priorities to form a list of candidate APs on which the candidate APs are placed in the order of priority.

As the mobile device 100 provides the list of candidate APs on which the candidate APs are placed in the order of priority for the electronic device 200, the electronic device 200 receiving the list of candidate APs placed in order may select an AP for wireless communication more effectively.

In an embodiment of the disclosure, the list of candidate APs and the home AP information transmitted to the electronic device 200 may include a BSSID, a channel number, and a password for each AP, and information indicating whether the AP is a home AP. The home AP refers to an AP currently connected to the mobile device 100.

The BSSID refers to an identifier to identify a basic service set or a network ID in a wireless LAN standard, and commonly refers to a MAC address of the AP. An AP supporting the multiband has a different BSSID for each frequency band, and a terminal may connect to a band by distinguishing the frequency bands by different BSSIDs.

The channel number may include a band and a channel number of a communication channel used by the AP.

The password includes cryptographic information required for authentication to access the AP.

The information indicating whether the AP is a home AP indicates whether the AP is the home AP that is currently connected to the mobile device 100.

The electronic device 200 includes a controller 250 and a communication interface 230.

The communication interface 230 includes multiple communication modules for Wi-Fi connection with an AP, communication with a BT device, or Wi-Fi peer-to-peer (P2P) communication with a peer device.

For example, the communication interface 230 may include a Wi-Fi module for wireless communication with the AP 300 over the wireless communication network 10, and a short-range communication module for short-range wireless communication with the electronic device 200 over the short-range communication network 20.

The controller 250 may include one or more processors to control the communication interface 230.

In an embodiment of the disclosure, the controller 250 may be connected to the mobile device 100 through the communication interface 230 for receiving from the mobile device 100 a list of candidate APs including information about one or more candidate APs selected from among APs having ever been connected to the mobile device 100 and home AP information about a home AP that is currently connected to the mobile device 100, selecting an AP for the electronic device 200 to make wireless connection based on the list of candidate APs and the home AP information received from the mobile device 100, and making wireless connection to the selected AP.

In this way, the electronic device 200 receives not only the information about the home AP currently connected to the mobile device 100 but also information about candidate APs selected from among the APs having ever been connected to the mobile device 100, and uses the received information about the APs to select an AP that may provide the best performance for the electronic device 200.

In an embodiment of the disclosure, to help the mobile device 100 create a list of candidate APs, the controller 250 may perform Wi-Fi channel scanning and create a list of scanned APs including one or more scanned APs and transmit the list to the mobile device 100. The list of candidate APs received from the mobile device 100 may include one or more APs as candidate APs, matched between the list of one or more APs having ever been connected to the mobile device 100 and the list of scanned APs.

As such, as the mobile device 100 determines the candidate APs by considering not only the APs each having ever been connected to the mobile device 100 but also information about the APs scanned by the electronic device 200, the mobile device 100 may reflect information about APs that suit the network environment of the electronic device 200 onto the list of candidate APs to be provided to the electronic device 200.

In an embodiment of the disclosure, the list of candidate APs received from the mobile device 100 may include one or more candidate APs matched between one or more APs having ever been connected to the mobile device 100 and one or more APs scanned by the mobile device 100.

For example, under a condition where the mobile device 100 is unable to receive the list of scanned APs from the electronic device 200, the mobile device 100 may transmit a list of candidate APs determined by taking into account not only the APs having ever been connected to the mobile device 100 but also the APs scanned by the mobile device 100.

In an embodiment of the disclosure, the list of candidate APs and the home AP information received from the mobile device 100 may include a service set identifier (SSID), a channel number, and a password for each AP, and information indicating whether the AP is a home AP.

As the electronic device 200 receives the SSID, channel number and password for each AP, and the information indicating whether the AP is a home AP from the mobile device 100, the electronic device 200 may determine whether the AP of the AP information received from the mobile device 100 is the home AP and make wireless connection to the AP with the password.

In an embodiment of the disclosure, for the electronic device 200 to select an AP for wireless connection based on the list of candidate APs and home AP information received from the mobile device 100, the controller 250 may determine the home AP to be an AP to be wirelessly connected when the home AP has the 5 GHz band and a higher level of wireless communication quality.

In another embodiment of the disclosure, for the electronic device 200 to select an AP for wireless connection based on the list of candidate APs and home AP information received from the mobile device 100, the controller 250 may determine a candidate AP to be an AP for wireless connection among the list of candidate APs, which has the 5 GHz band in the home AP when the home AP is the multiband AP.

As the electronic device 200 receives not only the information about a home AP but also the information about a list of candidate APs from the mobile device 100, the electronic device 200 may use the information on the list of candidate APs to select an optimal AP for wireless connection when the home AP is the multiband AP.

In an embodiment of the disclosure, the controller 250 may compare BSSIDs of one or more candidate APs included in the list of candidate APs with the BSSID of the home AP, and when there is a match in more than certain bytes, determine that the home AP is the multiband AP.

In an embodiment of the disclosure, for the electronic device 200 to select an AP for wireless connection based on the list of candidate APs and home AP information received from the mobile device 100, the controller 250 may select a candidate AP to be an AP for wireless connection from among the list of candidate APs, which has the best wireless communication quality, when the wireless communication quality of the home AP or a candidate AP having the 5 GHz band in the home AP is less than the threshold.

Figure 3:
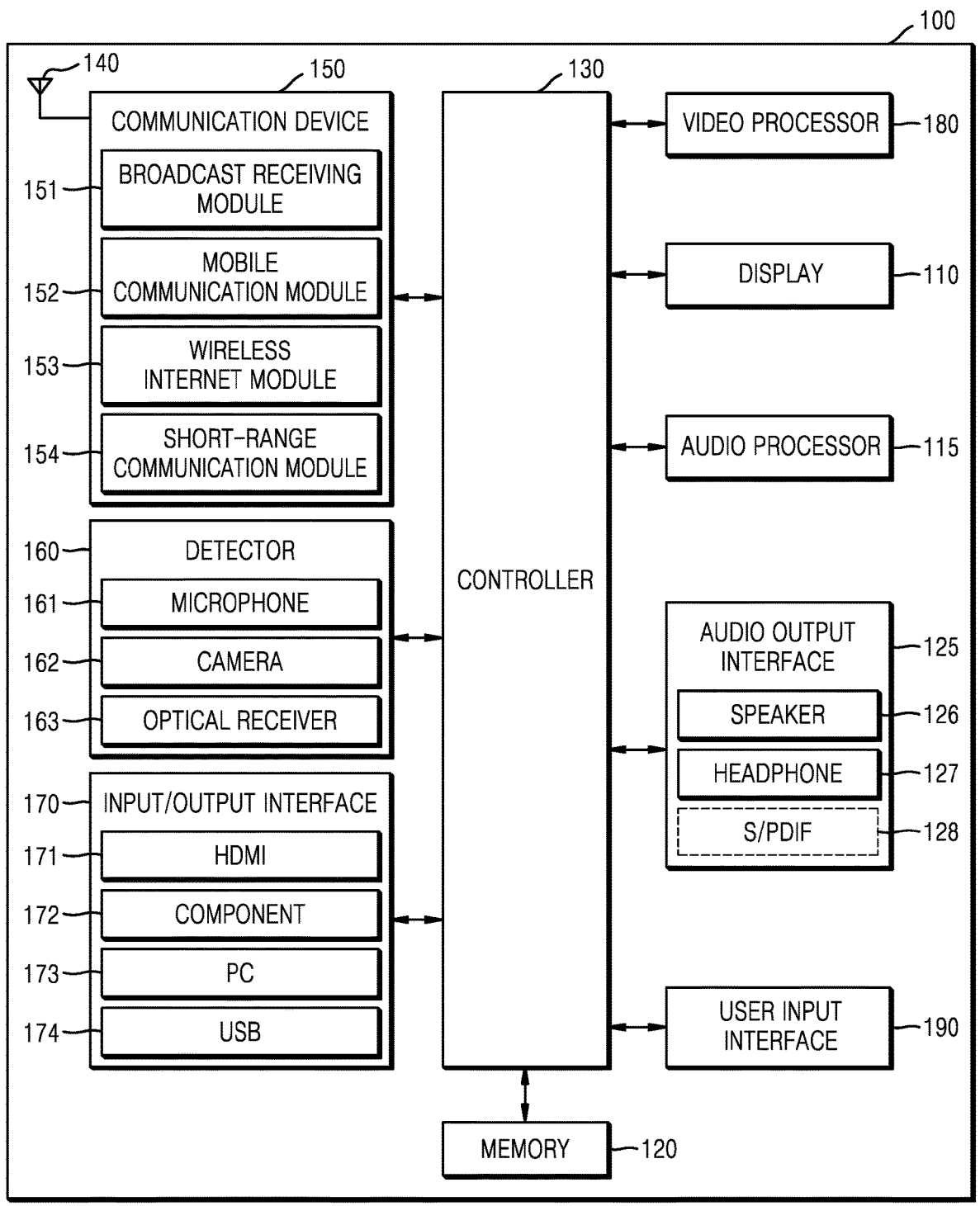
FIG. 3 is a block diagram illustrating a detailed configuration of the mobile device shown in FIG. 2.

FIG. 3 is a block diagram illustrating a detailed configuration of the mobile device 100 shown in FIG. 2.

Referring to FIG. 3, the mobile device 100 may include a display 110, a memory 120, an audio processor 115, an audio output device 125, a controller 130, a transmit/receive antenna 140, a communication interface 150, a detector 160, an input/output interface (input/output device) 170, a video processor 180, and a user input device 190.

The video processor 180 processes video data received by the mobile device 100. The video processor 180 may perform various image processing such as decoding, scaling, noise filtering, frame rate conversion, resolution conversion, etc., on the video data.

The display 110 may output a video included in a broadcast signal, a content, e.g., a video image received through the communication device 150 or the input/output interface (input/output device) 170, or an image stored in the memory 120 under the control of the controller 130.

The display 110 converts an image signal, a data signal, an on-screen display (OSD) signal, a control signal, etc., processed by the controller 130 into a driving signal. The display 110 may be implemented by a plasma display panel (PDP), a liquid crystal display (LCD), organic light emitting diodes (OLEDs), a flexible display, or a three dimensional (3D) display, or the like. Furthermore, the display 110 may have a touch screen to be used for an input device as well as for an output device.

The audio processor 115 processes audio data. For example, the audio processor 115 may perform various processing such as decoding, amplifying, noise filtering, etc., on the audio data. The audio processor 115 may include a plurality of audio processing modules to process audio for different contents.

The audio output device 125 outputs audio included in a broadcast signal under the control of the controller 130. The audio output device 125 may output audio, e.g., voice or sound, received through the communication device 150 or the input/output interface (input/output device) 170. Furthermore, the audio output device 125 may output audio stored in the memory 120*under the control of the controller 130. The audio output device 125 may include at least one or a combination of a speaker 126, a headphone output terminal 127 or s Sony/Philips digital interface (S/PDIF) 128.

The transmit/receive antenna 140 receives signals transmitted by other devices or transmits signals to the other devices. The transmit/receive antenna 140 may include one or more antennas. Accordingly, the mobile device 100 may support a multiple input multiple output (MIMO) system.

The communication interface 150 may include one or more modules that allow wireless communication between wireless communication systems or between the mobile device 100 and a network in which another electronic device is located. For example, the communication interface 150 may include a broadcast receiving module 151, a mobile communication module 152, a wireless Internet module 153, and a short-range communication module 154. The communication interface 150 may also be called a transceiver.

The broadcast receiving module 151 receives broadcast signals and/or broadcasting-related information from an external broadcasting management server on a broadcasting channel. The broadcast signals may include television broadcast signals, radio broadcast signals, data broadcast signals, and a combination thereof.

The mobile communication module 152 transmits or receives wireless signals to and from at least one of a base station, an external terminal, or a server in the mobile communication network. The wireless signal may include a voice call signal, a video call signal or different types of data involved in transmission/reception of a text/multimedia message.

The wireless Internet module 153 refers to a module for wireless Internet access, which may be built inside or outside the device. The wireless Internet technology may employ wireless LAN (WLAN), Wi-Fi, wireless broadband (Wibro), world interoperability for microwave access (Wimax), high speed downlink packet access (HSDPA), etc. The device may make Wi-Fi connection to another device through the wireless Internet module 153. For example, the controller 130 may use the wireless Internet module 153 to communicate with one or more APs 300.

In an embodiment of the disclosure, the wireless Internet module 153 may scan for one or more APs under the control of the controller 130. With the AP scanning, the mobile device 100 may obtain information about nearby APs by sending out a probe signal and receiving a response signal to the probe signal. For example, for Wi-Fi full scanning, the wireless Internet module 153 may transmit a probe request signal on each of all communication channels and receive in return a probe response signal, thereby identifying an AP that sends the probe response signal and channel information corresponding to the AP.

The short-range communication module 154 refers to a module for short-range communication. For the short-range communication technology, Bluetooth, Radio Frequency Identification (RFID), infrared Data Association (IrDA), Ultra Wideband (UWB), ZigBee, etc. may be used.

For example, the controller 130 may use the short-range communication module 154 to communicate with the electronic device 200 so that it may receive a list of scanned APs from the electronic device 200 or send a list of candidate APs to the electronic device 200.

The detector 160 may detect the user's voice, the user's image or the user's interaction, and may include a microphone 161, a camera 162, and an optical receiver 163.

The microphone 161 receives voice uttered by the user. The microphone 161 may convert the received voice into an electric signal and output the electric signal to the controller 130. The user's voice may include, for example, a voice corresponding to a menu or function of the mobile device 100.

The camera 162 may receive an image, e.g., consecutive frames, corresponding to a motion of the user including a gesture in a camera recognition range. The controller 130 may select a menu displayed on the mobile device 100 based on a received motion recognition result or perform control corresponding to the motion recognition result.

The optical receiver 163 receives an optical signal (including a control signal) from an external remote control device.

The input/output interface (input/output device) 170 receives a video (e.g., a moving image), an audio (e.g., a voice, music, etc.), additional information (e.g., an electronic program guide (EPG)), or the like from outside of the mobile device 100 under the control of the controller 130. The input/output interface (input/output device) 170 may include one of a high-definition multimedia interface (HDMI) port 171, a component (component jack) 172, a personal computer (PC) port 173, and a universal serial bus (USB) port 174. The input/output interface (input/output device) 170 may include a combination of the HDMI port 171, the component jack 172, the PC port 173, and the USB port 174.

The memory 120 may store various data, programs, or applications for driving and controlling the mobile device 100 under the control of the controller 130. The memory 120 may store signals or data input or output according to operations of the video processor 180, the display 110, the audio processor 115, the audio output device 125, the antenna 140, the communication device 150, the detector 160, and the input/output interface (input/output device) 170.

The memory 120 may store an operating system to control the mobile device 100 and the controller 130, an application provided by a manufacturer by default or downloaded from outside, a graphical user interface (GUI) related with the application, objects to provide the GUI, e.g., images, text, icons, buttons, etc., user information, documents, databases, or associated data.

The memory 120 includes a read only memory (ROM), a random access memory (RAM), or a memory card (e.g., a micro secure digital (SD) card, a USB memory, which are not shown) attached to the mobile device 100. The memory 120 may also include a non-volatile memory, a volatile memory, a hard disc drive (HDD), or a solid state drive (SSD).

In an embodiment of the disclosure, the memory 120 may include one or more instructions to perform functions of the controller 130 as described above in connection with FIG. 3.

In an embodiment of the disclosure, the memory 120 may store a list of one or more APs to each of which the mobile device 100 has a history of being wirelessly connected.

The controller 130 may control general operation of the mobile device 100 and signal flows between the internal components of the mobile device 100, and process data. The controller 130 may run an operating system (OS) and various applications stored in the memory 120 at the user's request or when a predetermined condition is met.

The controller 130 may include a RAM to store a signal or data received from outside of the mobile device 100 or to be used for a storage sector corresponding to various tasks performed in the mobile device 100, a ROM to store a control program to control the mobile device 100, and a processor.

In an embodiment of the disclosure, the controller 130 may create the list of candidate APs to provide for the electronic device 200 and send the list to the electronic device 200 by executing the one or more instructions stored in the memory 120.

The list of candidate APs may be created in many different ways.

For example, the list of candidate APs may include information about one or more candidate APs selected from among the APs to each of which the mobile device 100 has a history of being connected. The one or more candidate APs may include an AP that overlaps an AP scanned by the electronic device 200. Alternatively, the one or more candidate APs may include an AP that overlaps an AP scanned by the mobile device 100.

In an embodiment of the disclosure, when sending the list of candidate APs, the controller 130 may provide a list of all the candidate APs, or provide a list of candidate APs that have a certain level of communication quality, or provide the list of candidate APs by placing them in certain order.

The processor may include a plurality of processors. For example, the processor may be implemented with a main processor (not shown) and a sub processor (not shown) activated in a sleep mode. The controller 130 may also be referred to as a micro controller, a microprocessor, or the like, which may be implemented in hardware, firmware, software, or a combination thereof.

The block diagram of the mobile device 100 is merely an example that is implemented in an embodiment of the disclosure. Components of the block diagram may be merged, added or omitted according to actual specifications of the mobile device 100. In other words, two or more components may be merged into one, or a single component may be split into two or more components as needed. Functions performed in the blocks are shown for explaining the embodiment of the disclosure, and the disclosure is not limited to the detailed operation or components corresponding to the blocks.

The detailed block diagram of the electronic device 200 may be similar to that of the mobile device 100 as shown in FIG. 3. However, the memory of the electronic device 200 may store one or more instructions to perform operation of the electronic device 200 as described above in connection with FIG. 2, and the controller of the electronic device 200 may execute the one or more instructions stored in the memory.

Figure 4:
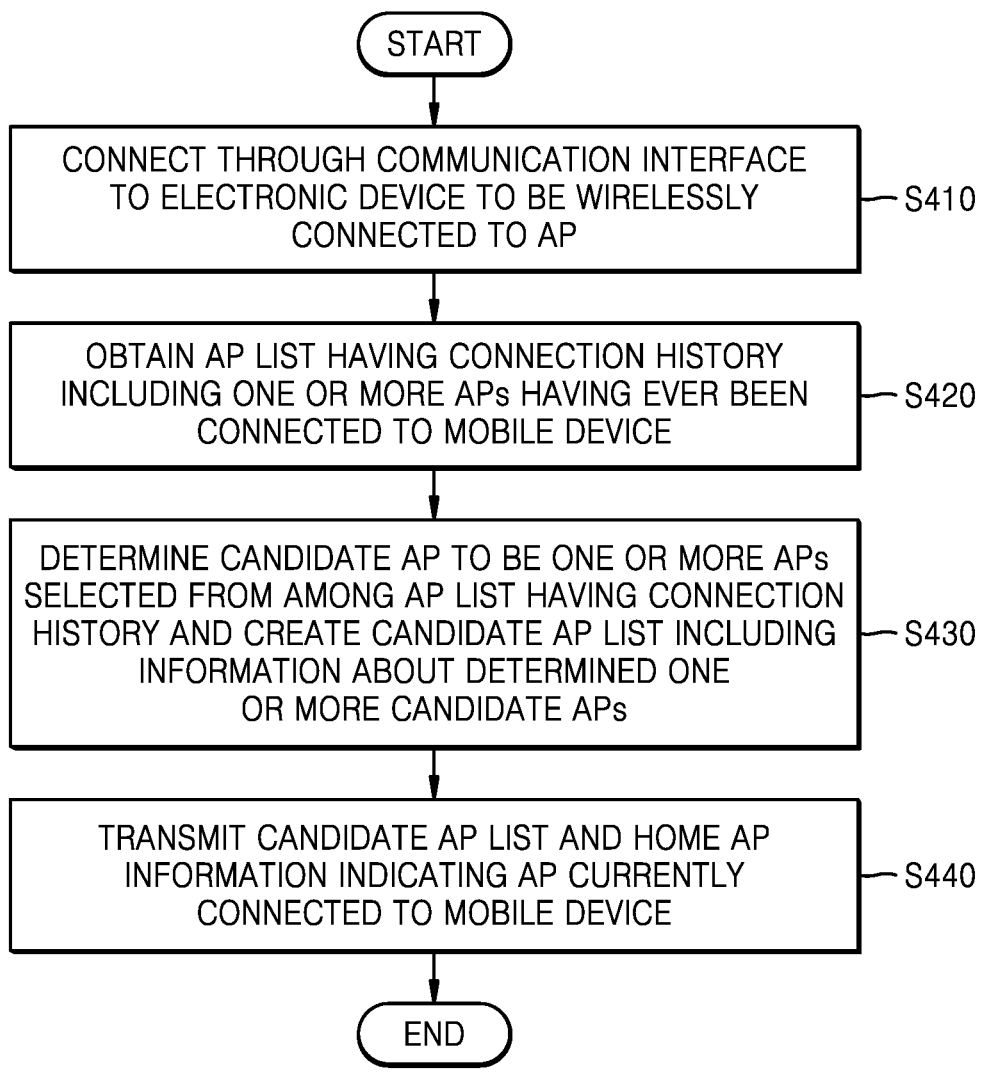
FIG. 4 is a flowchart illustrating operation of a mobile device, according to an embodiment of the disclosure.

FIG. 4 is a flowchart illustrating operation of the mobile device 100, according to an embodiment of the disclosure.

Referring to FIG. 4, in operation 410, the mobile device 100 is connected through a communication interface to the electronic device 200 to be connected to an AP. For automatic Wi-Fi connection through the mobile device 100, the mobile device 100 are directly connected to the electronic device 200 using a communication scheme such as BLE, BT, soft AP, etc. It is not, however, limited to the communication scheme, and any technology that allows the mobile device 100 to communicate with the electronic device 200 may be used.

For example, the mobile device 100 may be connected to the electronic device 200 by running an application that adds a device to the mobile device 100.

For example, during an initialization operation of the electronic device 200 after the electronic device 200 is powered on, the mobile device 100 may be connected to the electronic device 200.

In operation 420, the mobile device 100 obtains a list of one or more APs to each of which the mobile device 100 has a history of being connected. For example, the mobile device 100 may obtain the AP list having the connection history from the memory 120. The mobile device 100 may store information regarding connection to the APs that has ever been connected to the mobile device 100 in the memory, and obtain the AP list having the connection history based on the connection information stored in the memory.

In operation 430, the mobile device 100 determines one or more APs selected from the AP list having the connection history as candidate APs and create the list of candidate APs including information about the determined one or more candidate APs.

For example, the mobile device 100 may receive from the electronic device 200 a list of scanned APs including information about APs scanned by the electronic device 200, compare the list of scanned APs with the AP list having the connection history to determine matches as candidate APs, and create the list of candidate APs with the candidate APs.

In another example, when no list of scanned APs is received from the electronic device 200, the mobile device 100 itself may scan APs to create a list of scanned APs, compare the list of scanned APs with the AP list having the connection history to determine matched APs as candidate APs, and create the list of candidate APs including the candidate APs.

In operation 440, the mobile device 100 may transmit the list of candidate APs and information about a home AP currently connected to the mobile device 100 to the electronic device 200. Again, the home AP refers to an AP currently connected to the mobile device 100, the information of which may or may not be included in the list of candidate APs created in operation 430. In the case that the information of the home AP is included in the list of candidate APs, the mobile device 100 may send out the list of candidate APs. Otherwise, when the information of the home AP is not included in the list of candidate APs, the mobile device 100 may send out information about the home AP along with the list of candidate APs.

Figure 5:
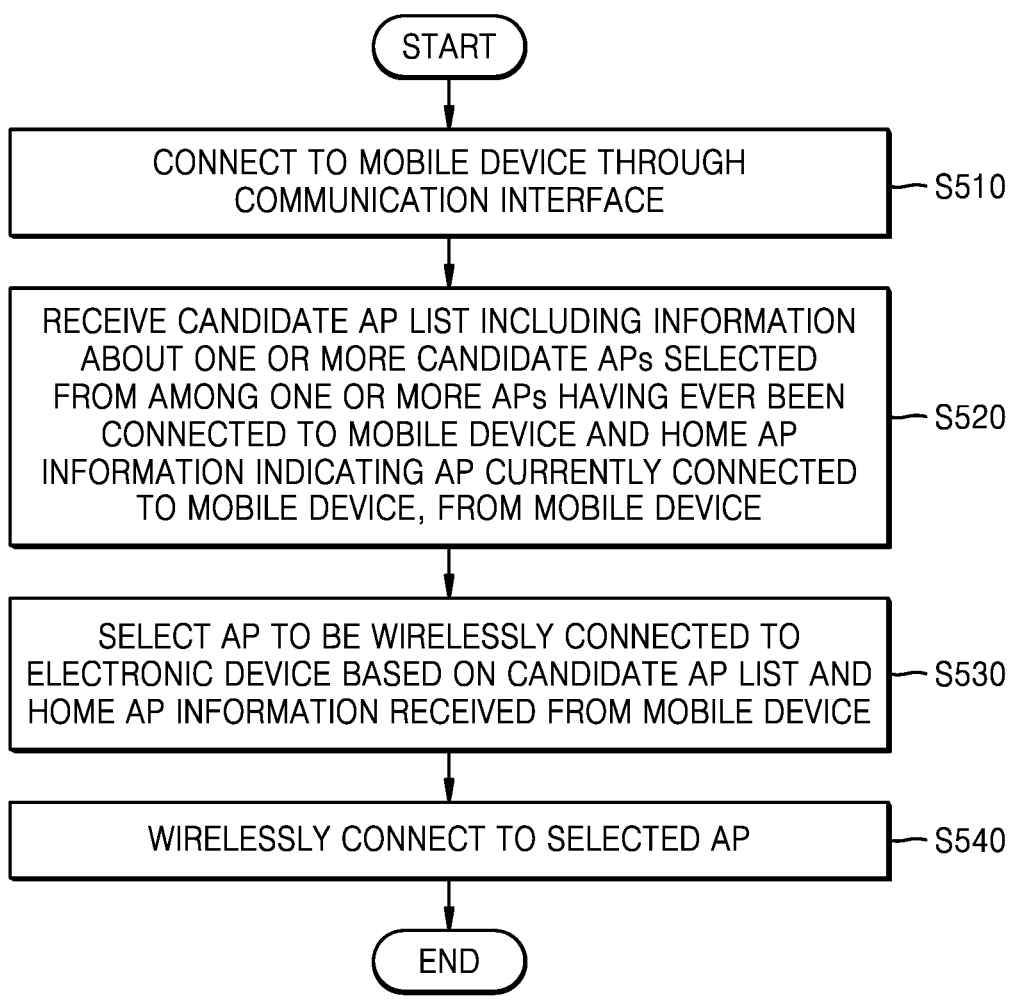
FIG. 5 is a flowchart illustrating operation of an electronic device, according to an embodiment of the disclosure.

FIG. 5 is a flowchart illustrating operation of the electronic device 200, according to an embodiment of the disclosure.

Referring to FIG. 5, in operation 510, the electronic device 200 is connected to the mobile device 100 through a communication interface.

For example, the electronic device 200 may be directly connected to the mobile device 100 in order to perform automatic Wi-Fi connection through the mobile device 100, and the connection of the electronic device 200 with the mobile device 100 may be made using the BLE, BT, soft AP, or the like.

In operation 520, the electronic device 200 receives from the mobile device 100 the list of candidate APs including information about one or more candidate APs selected from among one or more APs that have ever been connected to the mobile device 100 and the information about a home AP currently connected to the mobile device 100.

In an embodiment of the disclosure, the list of candidate APs received by the electronic device 200 may include one or more candidate APs selected to be APs matched between the list of scanned APs including one or more APs scanned by the electronic device 200 and the list of APs having ever been connected to the mobile device 100. For this, the electronic device 200 may perform Wi-Fi full scanning and transmit a list of scanned APs to the mobile device 100.

In an embodiment of the disclosure, the list of candidate APs received by the electronic device 200 may include one or more candidate APs selected to be APs matched between the list of scanned APs including one or more APs scanned by the electronic device 200 and the list of APs having ever been connected to the mobile device 100.

In operation 530, the electronic device 200 may select an AP for wireless connection based on the list of candidate APs and the home AP information received from the mobile device 100.

In an embodiment of the disclosure, the electronic device 200 may select the home AP for wireless connection when the home AP has the 5 GHz band and good wireless communication quality.

In an embodiment of the disclosure, when the home AP is the 2.4 GHz AP and constitutes the multiband AP, the electronic device 200 may select a 5 GHz AP in the a multiband AP for wireless connection.

In an embodiment of the disclosure, the electronic device 200 may select a candidate AP with the best wireless communication quality to be wirelessly connected to the electronic device 200 from among candidate APs when the home AP, the 2.4 GHz AP that constitutes the multiband AP, has poor wireless communication quality.

In operation 540, the electronic device 200 is wirelessly connected to the selected AP. The electronic device 200 may use the password included in the list of candidate APs received from the mobile device 100 to make wireless connection to the AP selected in operation 530.

Figure 6:
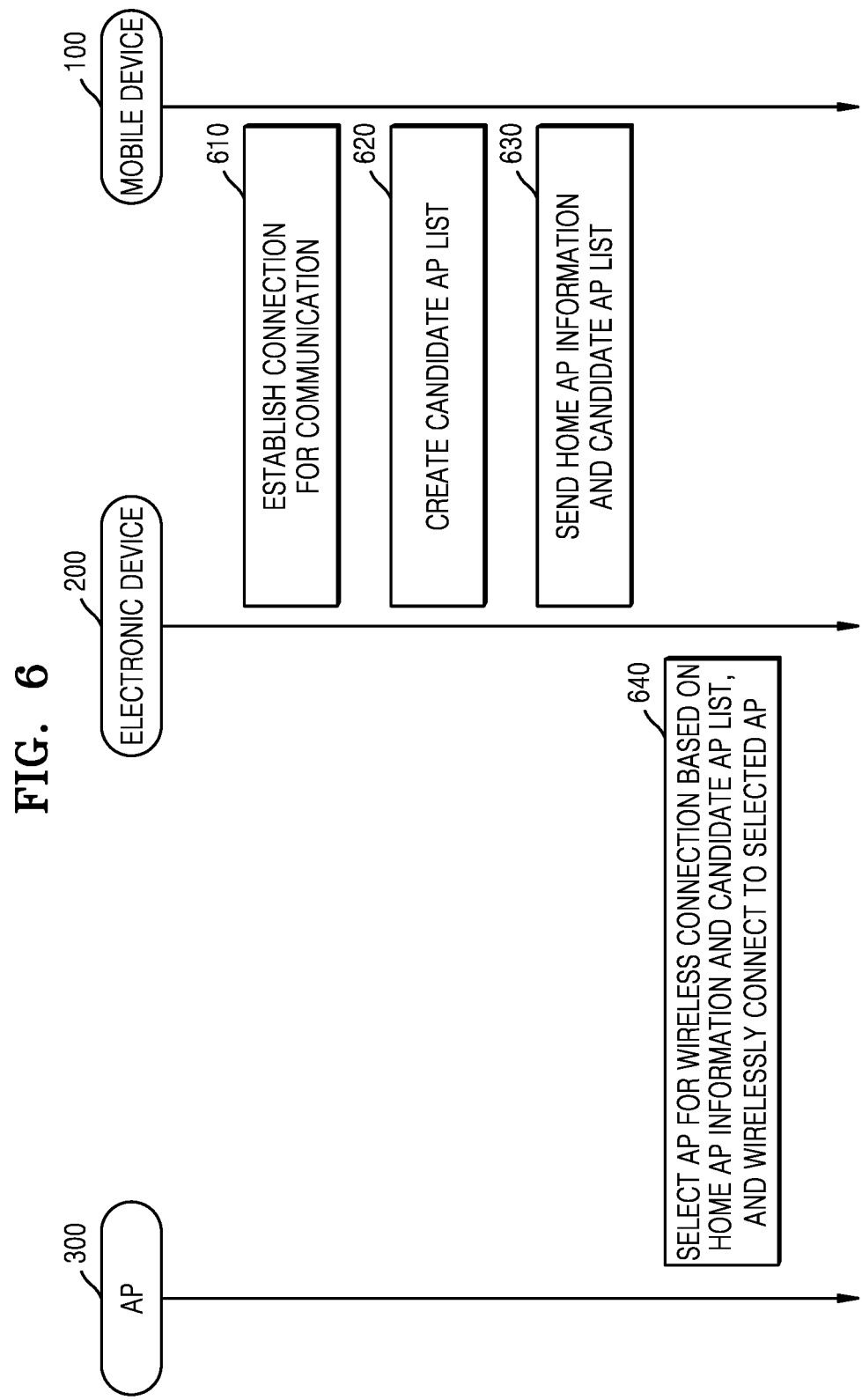
FIG. 6 is a flowchart illustrating operations between a mobile device and an electronic device, according to an embodiment of the disclosure.

FIG. 6 is a flowchart illustrating operations between the mobile device 100 and the electronic device 200, according to an embodiment of the disclosure.

Referring to FIG. 6, in operation 610, the mobile device 100 and the electronic device 200 establish connection for communication. Not in a Wi-Fi connected state, the electronic device 200 may use a connectivity technology such as BLE, BT, soft AP, etc., to make direct connection with an external device such as the mobile device 100 to exchange data with the mobile device 100. In practice, the direct connection between the mobile device 100 and the electronic device 200 may be performed by the mobile device100 running a device addition application to add the electronic device 200 to the mobile device 100 or by the electronic device 200 scanning for nearby devices when powered on and performing initialization operation.

In operation 620, the mobile device 100 creates a list of candidate APs.

In operation 630, the mobile device 100 sends home AP information and the list of candidate APs to the electronic device 200.

In operation 640, the electronic device 200 selects an AP for wireless connection based on the home AP information and the list of candidate APs, and performs wireless connection to the selected AP.

Figure 7:
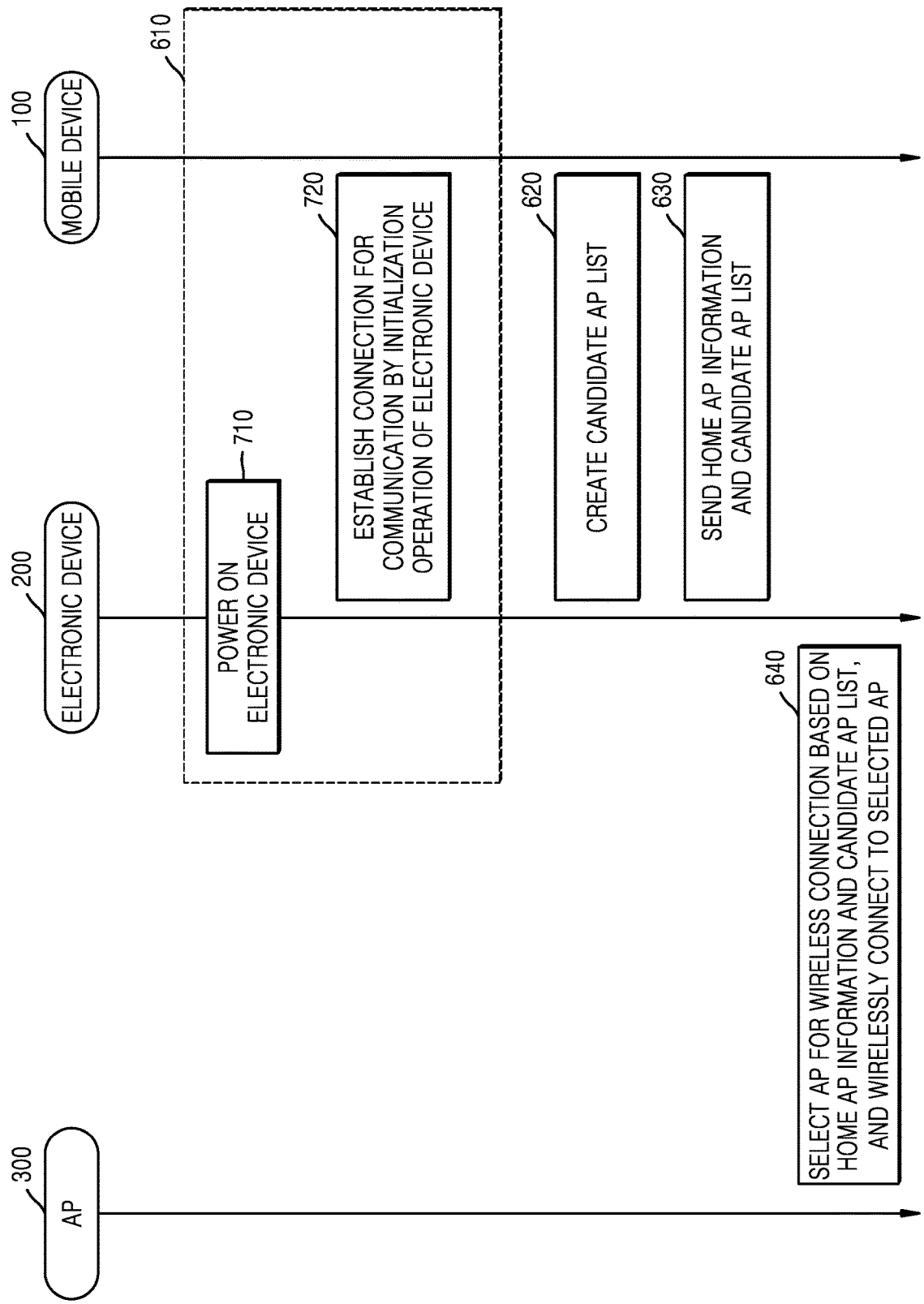
FIG. 7 shows operations of connection for communication between a mobile device and an electronic device, according to an embodiment of the disclosure.

FIG. 7 shows the operation 610 of connection for communication between the mobile device 100 and the electronic device 200, according to an embodiment of the disclosure.

Referring to FIG. 7, in operation 710, the electronic device 200 is powered on.

In operation 720, the electronic device 200 establishes connection with the mobile device 100 for communication through an initializing operation.

For example, when the electronic device having been in power saving mode or standby mode receives an input from the user, such as a power-on input, the electronic device 200 starts initializing operation. The initializing operation may include, for example, booting up operation. In the initialization operation, the electronic device 200 may be prepared for performing a function in response to an input from the user when the input is received, by loading an operating system or one or more applications onto the memory. Also in the initialization operation, the electronic device 200 may discover an external device around the electronic device 200 using the short-range communication function and establish connection with the discovered external device.

For example, the electronic device 200 may scan for devices around the electronic device 200, which are capable of performing BLE communication, and establish connection with the BLE devices for communication. In this case, the electronic device 200 may use a BLE module to scan for the nearby mobile device 100 and establish connection with the mobile device 100 for communication.

Figure 8:
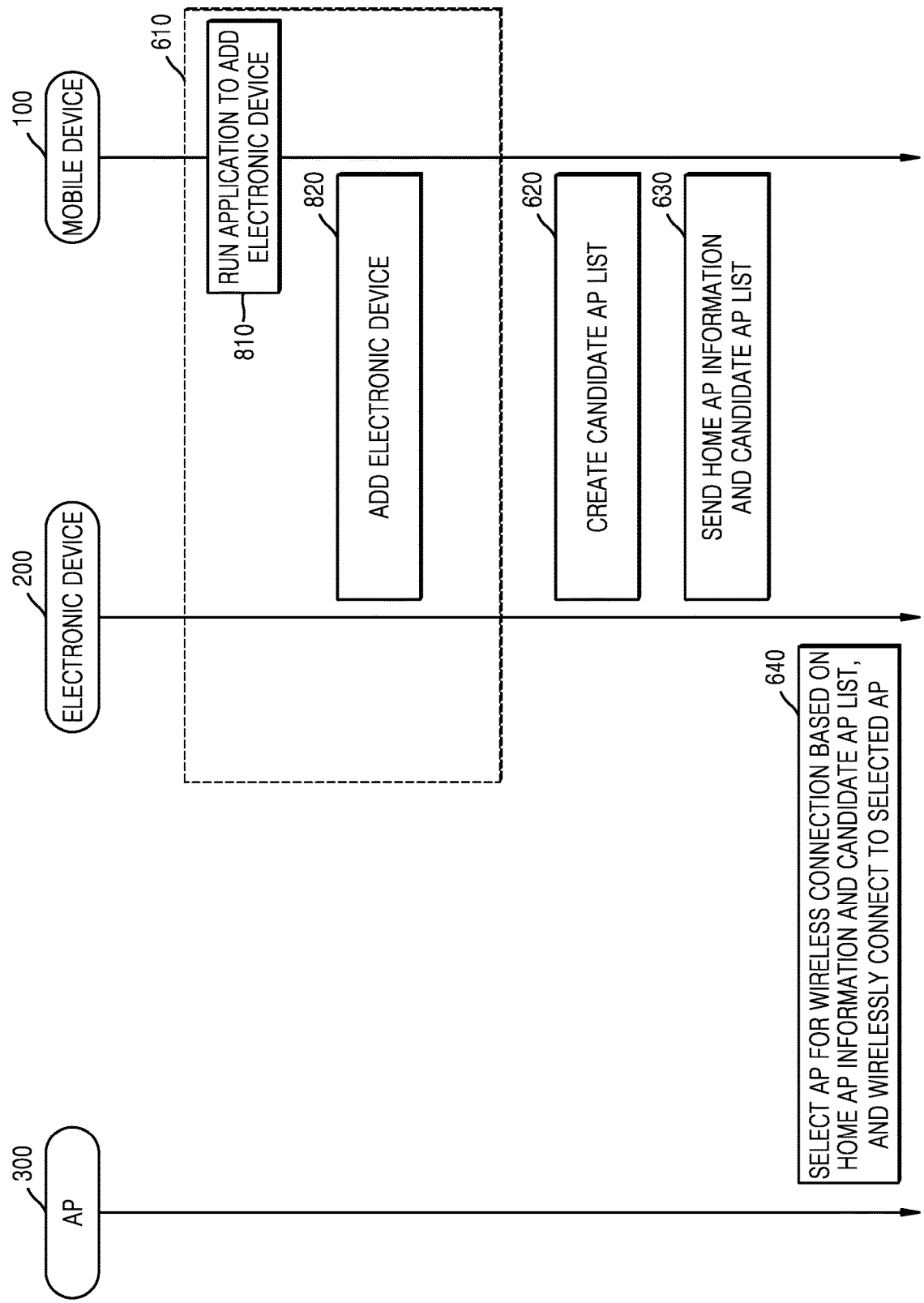
FIG. 8 shows operations of connection for communication between a mobile device and an electronic device, according to another embodiment of the disclosure.

FIG. 8 shows the operation 610 of connection for communication between the mobile device 100 and the electronic device 200, according to another embodiment of the disclosure.

Referring to FIG. 8, in operation 810, the mobile device 100 may run an application to add external devices.

In operation 820, the mobile device 100 establishes connection with the electronic device 200 for communication by the operation to add the electronic device 200.

For example when the user enters a command to the mobile device 100 to run the device addition application, the mobile device 100 may run the application to add the electronic device 200. When the mobile device 100 is scanning for external devices using e.g., BLE GATT, the electronic device 200 may respond to the scan request. On receiving the response from the electronic device 200, the mobile device 100 may provide the user with an output indicating that the electronic device 200 has been discovered. When the user enters e.g., a corresponding PIN number to the mobile device 100, connection for communication between the mobile device 100 and the electronic device 200 may be completed.

Figure 9:
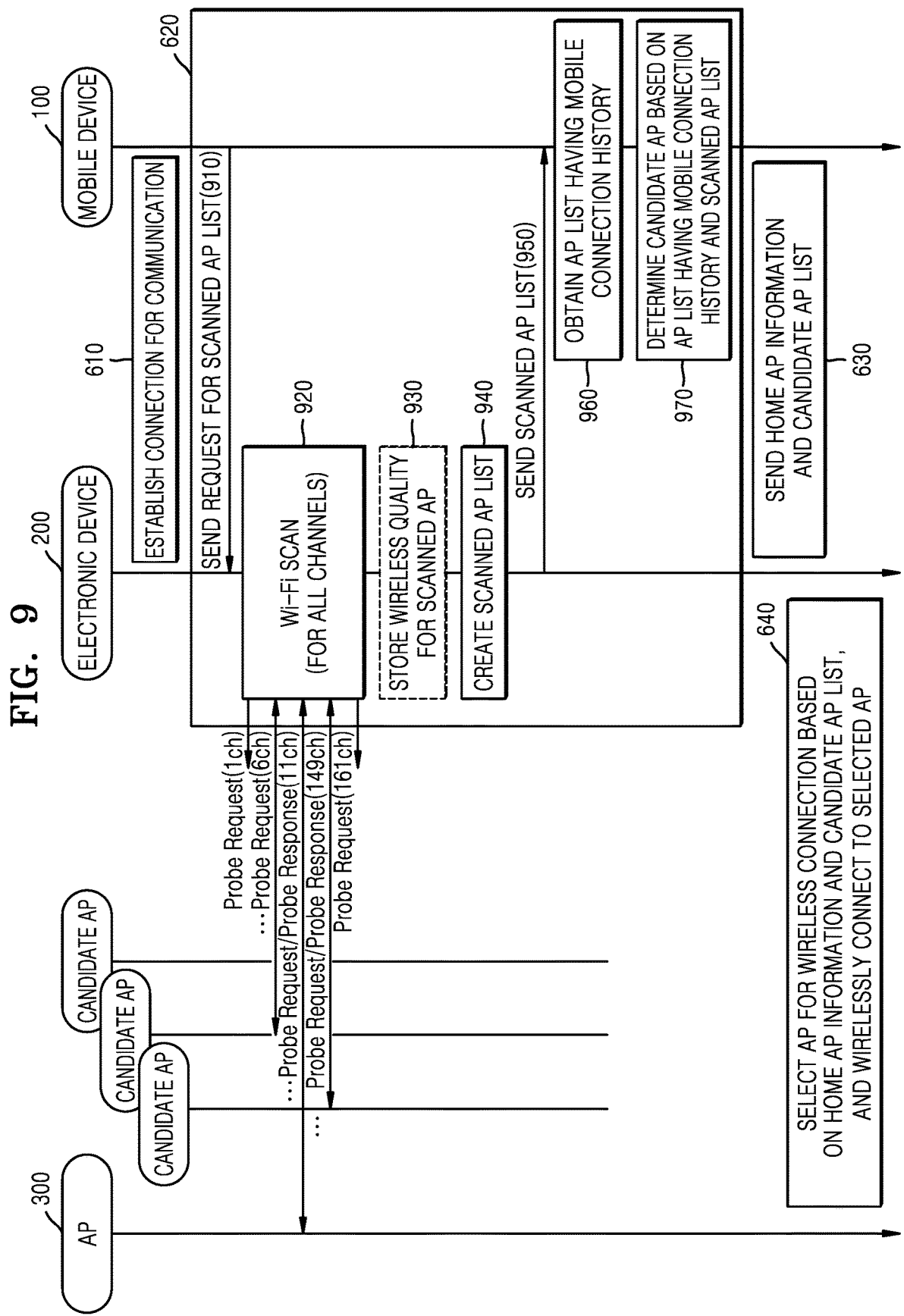
FIG. 9 shows an operation of a mobile device of creating a list of candidate APs, according to an embodiment of the disclosure.

FIG. 9 shows the operation 620 of creating a list of candidate APs by a mobile device, according to an embodiment of the disclosure.

Referring to FIG. 9, in operation 910, the mobile device 100 sends the electronic device 200 connected in operation 610 a request for a list of scanned APs.

In operation 920, on receiving the request for list of scanned APs from the mobile device 100, the electronic device 200 performs Wi-Fi full scanning operation. The Wi-Fi full scanning operation refers to Wi-Fi scanning for all the nearby devices on all channels. For example, the electronic device 200 transmits a probe request frame on all channels from channel number 1 to channel number 161. APs receiving the probe request frame from the electronic device 200 may transmit a probe response frame to the electronic device 200. For example, when receiving a probe response frame from an AP in return for the transmission of the probe request frame on channel number 5, the electronic device 200 may identify that there is a nearby AP available for communication using the channel number 5. For example, when the electronic device 200 receives the probe response frame to the probe request frame on channel numbers 6, 11 and 149, the electronic device 200 may create a list of scanned APs including APs corresponding to the channel numbers 6, 11, and 149. Those APs identified to be available for communication may be called scanned APs.

By this Wi-Fi full scanning operation, the electronic device 200 may identify nearby APs and corresponding channels available for communication.

In operation 930, the electronic device 200 determines and stores signal quality of wireless communication of each of the scanned APs. The information about the quality of wireless communication of the scanned AP may include signal strength, noise ratio, link speed, etc.

In operation 940, the electronic device 200 creates a list of scanned APs based on the information about the APs scanned in operation 920 and the signal quality of wireless communication determined for each of the scanned APs in operation 930. An example of the list of scanned APs are shown in FIG. 10A.

FIG. 10A shows a list of scanned APs created by the electronic device 200.

Referring to FIG. 10A, a list of scanned APs 1010 includes information about one or more scanned APs. The information about an AP may include an SSID 1011, a channel 1012, a BSSID 1013, and signal quality information 1014.

The SSD refers to an identifier for connection between a wireless terminal and the AP used for a service provider to distinguish a wireless cell from among many different wireless cells.

The channel 1012 may refer to a channel number and frequency band used for communication with the AP.

The BSSID 1013 refers to a MAC address of the AP.

The signal quality information 1014 may refer to signal quality of wireless communication determined for the AP, including signal strength, noise ratio, link speed, etc.

Referring to FIG. 10A, the list of scanned APs 1010 includes information about a plurality of scanned APs from AP #1 to AP # n. For example, a first AP on the list of scanned APs 1010 is shown as an AP that communicates on channel number 6 in 2.4 GHz frequency band.

In operation 950, the electronic device 200 transmits the list of scanned APs 1010 created in operation 940 to the mobile device 100.

The list of scanned APs 1010 may include information about one or more scanned APs. The electronic device 200 may transmit all the list of scanned APs 1010 without modification, or transmit some of the list of scanned APs 1010.

In an embodiment of the disclosure, the electronic device 200 may transmit the entire list of scanned APs 1010 created in operation 940 to the mobile device 100 without omission. Although the list of scanned APs includes information about many APs, the electronic device 200 may provide the intact list of scanned APs to the mobile device 100 without modification, addition or omission, in order for the mobile device 100 to select a candidate AP on its own.

In an embodiment of the disclosure, the electronic device 200 may place the APs included on the list of scanned APs in the order of having better signal quality and provide the ordered list to the mobile device 100. On receiving the ordered list, the mobile device 100 may quickly leave out APs with lower quality levels from the ordered list.

In an embodiment of the disclosure, the electronic device 200 may select APs with higher signal quality than a threshold from among the scanned APs, and provide a list of the selected APs to the mobile device 100. As the APs with lower signal quality than the threshold is less likely to be selected for communication, providing a list of APs with better signal quality rather than providing the huge amount of the entire list of scanned APs to the mobile device 100 may help to reduce the amount of data transmission.

In operation 960, the mobile device 100 obtains a list of APs each having a mobile connection history including information about one or more APs having ever been connected to the mobile device 100. An example of the list of APs having the mobile connection history is shown in FIG. 10B.

FIG. 10B shows an example of a list of APs each having a mobile connection history 1020.

The list of APs having the mobile connection history 1020 may include information about one or more APs having ever been connected to the mobile device 100, the information for an AP including an SSID 1021, a password 1022, a channel 1023, and a BSSID 1024.

The information about APs included in the list of APs having the mobile connection history further includes an item of the password 1022 as compared with the information about APs included in the list of scanned APs 1010. As the AP having the mobile connection history has ever been connected to the mobile device 100, the mobile device 100 may already have the password information used for connection to the AP. When the mobile device 100 provides the password information to the electronic device 200, the electronic device 200 may make connection to the AP.

In operation 970, the mobile device 100 creates a list of candidate APs based on the list of APs having the mobile connection history and the list of scanned APs.

In an embodiment of the disclosure, the mobile device 100 may compare the list of APs having the mobile connection history with the list of scanned APs to find matched APs, and create a list of candidate APs based on information about the matched APs. Specifically, the mobile device 100 may have the password information for an AP to which the mobile device 100 has ever been connected, and find the same AP from the APs scanned by the electronic device 200 and select the AP as a candidate AP.

Hence, there is no need for the mobile device 100 to send APs for the channels and bands not having been Wi-Fi scanned by the electronic device 200. Accordingly, the mobile device 100 may not send all the list of APs that have ever been connected to the mobile device 100 to the electronic device 200 but create a list of candidate APs to include the APs scanned directly by the electronic device 200. When not receiving the list of scanned APs from the electronic device 200, the mobile device 100 may perform scanning on its own and create a list of candidate APs by comparing the list of APs scanned by the mobile device 100 with the list of APs having ever been connected to the mobile device 100. This example will be further described with reference to FIG. 11.

An example of the list of candidate APs created by the mobile device 100 is shown in FIG. 10C.

FIG. 10C shows an example of a list of candidate APs, according to an embodiment of the disclosure.

Referring to FIG. 10C, the list of candidate APs 1030 may include one or more candidate APs, and information about a candidate AP may include an SSID 1031, a password 1032, a channel 1033, a BSSID 1034, information about whether the AP is a home AP 1035, information about whether the AP is a candidate AP 1036, and signal quality information 1037.

When the information about APs included in the list of scanned APs 1010 as shown in FIG. 10A is compared with the information about APs included in the list of APs having the mobile connection history 1020 as shown in FIG. 10B, it may be seen that four APs, AP #1_2.4, AP #1_5, AP #2, AP #3 are matched between both the lists. There are passwords stored for the four APs because the mobile device 100 has ever been connected to the four APs, and the four APs also represent APs scanned by the electronic device 200. Accordingly, the mobile device 100 may determine the four matched APs as candidate APs. The mobile device 100 may also create a list of candidate APs including information about the four matched APs.

Although the information about whether the AP is a home AP 1035 and the information about whether the AP is a candidate AP are provided in separate fields in FIG. 10C, they may be provided in a single field. In the latter case, for example, "1" indicates that the AP is a home AP and "0" indicates that the AP is a candidate AP. The home AP refers to an AP currently connected to the mobile device 100. The candidate AP refers to an AP matched between the list of scanned APs 1010 and the list of APs having the mobile connection history 1020 as shown in FIG. 10B. Among the matched APs, there may be the home AP. For example, referring to FIG. 10C, the list of candidate APs 1030 includes matched candidate APs, among which AP #1_2.4 represents the home AP.

When there is an AP currently connected to the mobile device 100 among the matched candidate APs, the mobile device 100 may indicate the AP as the home AP. When there is no AP currently connected to the mobile device 100 among the matched candidate APs, the mobile device 100 may add home AP information to the list of candidate APs.

In an embodiment of the disclosure, to create a list of candidate APs, the mobile device 100 may find all APs that are matched between information about APs included in the list of scanned APs 1010 and information about APs included in the list of APs having the mobile connection history 1020, select all the matched APs as candidate APs and create a list of candidate APs to include the selected candidate APs.

In an embodiment of the disclosure, the mobile device 100 may select not all but some of the matched APs that have higher signal quality than a certain threshold as candidate APs, and create a list of candidate APs to include the selected candidate APs.

In an embodiment of the disclosure, the mobile device 100 may determine all the matched APs as candidate APs and include them on the list of candidate APs, and place the candidate APs on the list of candidate APs in the order of signal quality.

Figure 11:
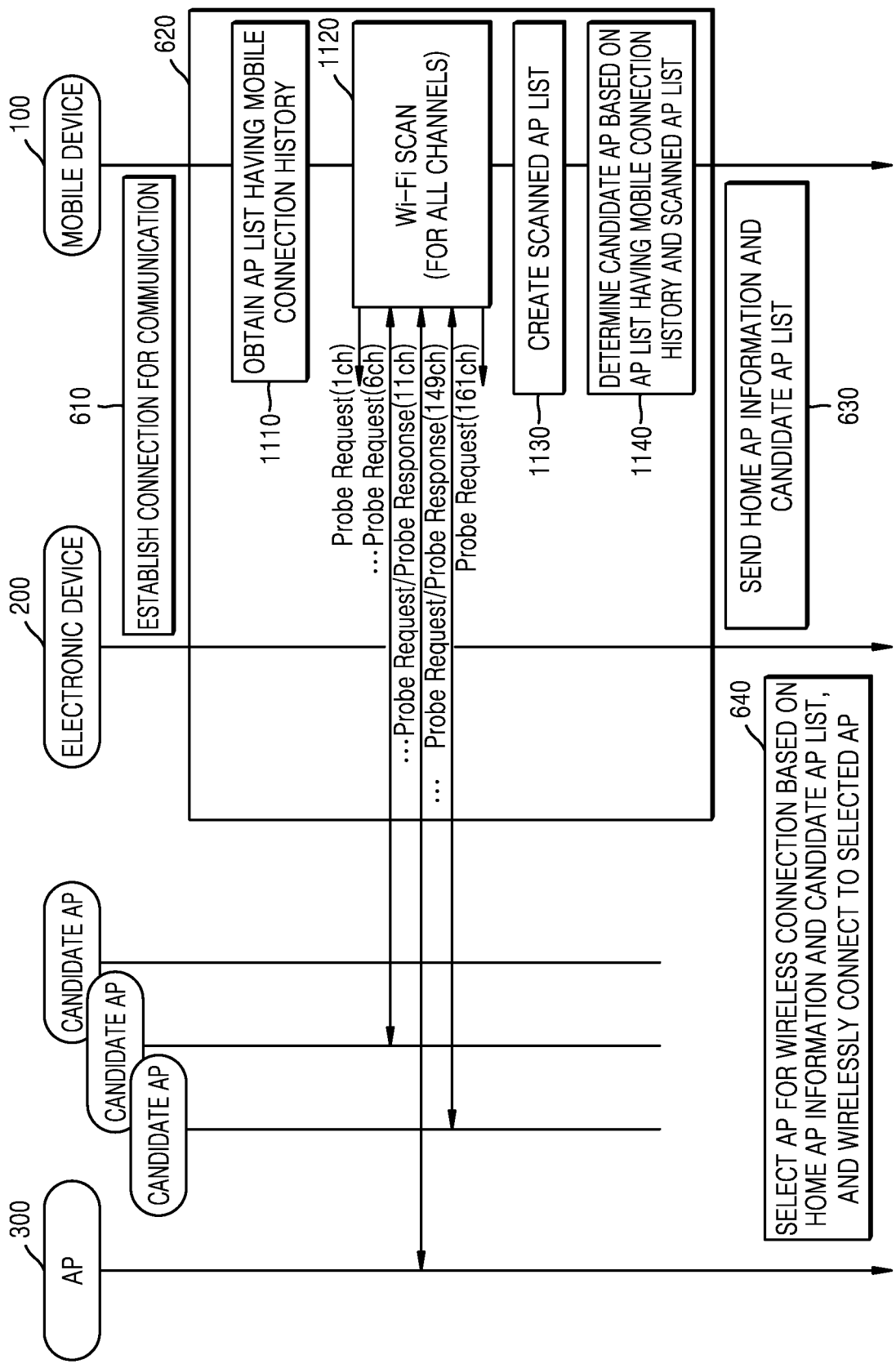
FIG. 11 shows an operation of a mobile device of creating a list of candidate APs, according to another embodiment of the disclosure.

FIG. 11 shows the operation 620 of creating a list of candidate APs by the mobile device 100, according to an embodiment of the disclosure.

Referring to FIG. 11, in operation 1110, the mobile device 100 obtains a list of APs having the mobile connection history.

In operation 1120, the mobile device 100 performs Wi-Fi full scanning for APs around the mobile device 100. When the mobile device 100 may not receive the list of scanned APs from the electronic device 200 for some reason, the mobile device 100 may create a list of scanned APs by performing Wi-Fi full scanning on its own. The Wi-Fi full scanning is identical to the Wi-Fi full scanning operation of the electronic device 200 of FIG. 9.

In operation 1130, the mobile device 100 creates a list of scanned APs using information about the scanned APs obtained by the Wi-Fi full scanning in operation 1120.

In operation 1140, the mobile device 100 creates a list of candidate APs based on the list of APs having the mobile connection history and the list of scanned APs. The list of candidate APs may be created in the methods as described above with reference to FIG. 9.

Figure 12:
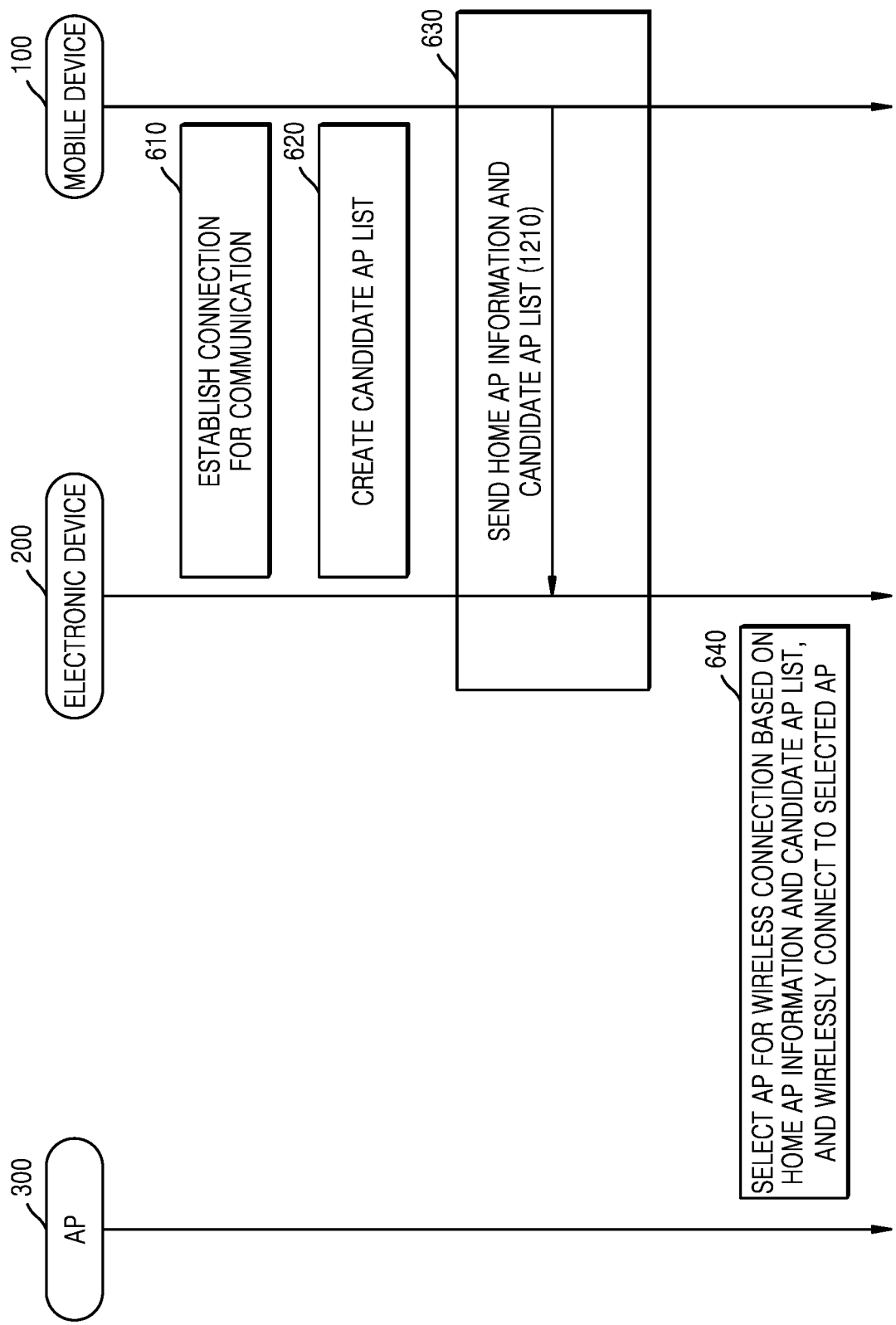
FIG. 12 shows an operation of a mobile device of sending a list of candidate APs, according to an embodiment of the disclosure.

FIG. 12 shows the operation 630 of sending a list of candidate APs by the mobile device 199, according to an embodiment of the disclosure.

Referring to FIG. 12, in operation 1210, the mobile device 100 sends the created list of candidate APs and the home AP information to the electronic device 200. For example, the mobile device 100 may send the list of candidate APs as shown in FIG. 10C to the electronic device 200. In the example of FIG. 10C, the list of candidate APs includes information about a home AP. In the example, an AP with the information about whether the AP is a home AP 1035 indicated as "o" and the SSID indicated as "AP #1_2.4" represents the home IP.

Figure 13:
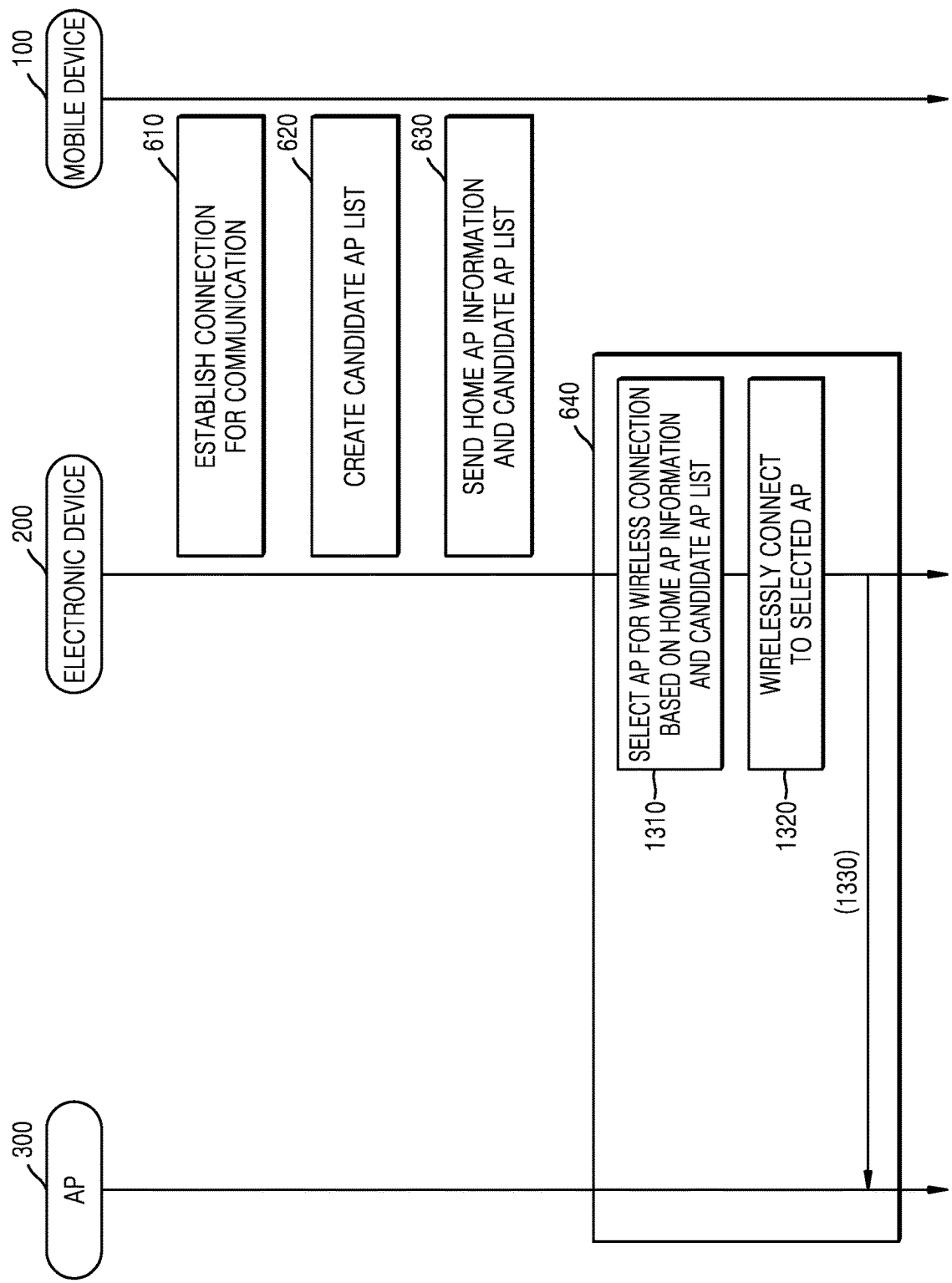
FIG. 13 shows an operation of an electronic device of selecting and connecting to a candidate AP to be wirelessly connected, according to an embodiment of the disclosure.

FIG. 13 shows the operation 640 of selecting and wirelessly connecting to a candidate AP by the electronic device 200, according to an embodiment of the disclosure.

Referring to FIG. 13, in operation 1310, on receiving the home AP information and the list of candidate APs from the mobile device 100, the electronic device 200 selects an AP for wireless connection based on the home AP information and the list of candidate APs.

For example, the electronic device 200 may check the home AP information and determine whether the home AP is in the 5 GHz band or the 2.4 GHz band.

When the home AP is in the 5 GHz band and has good wireless communication quality, the home AP may be selected for wireless connection.

When the home AP is in the 2.4 GHz band, it may be determined whether the home AP constitutes a multiband AP. When the home AP is one AP in the multiband AP, the other AP in the multiband AP, which has the 5 GHz band, may be selected for wireless connection.

However, when both the 5 GHz home AP and the 5 GHz multiband AP have poor signal quality, the electronic device 200 may select a candidate AP having the best signal quality for wireless connection from among the candidate APs other than the home AP.

In operation 1320, the electronic device 200 performs wireless connection to the selected AP.

In operation 1330, the electronic device 200 performs wireless connection to the selected AP by transmitting a password to the selected AP.

Figure 14:
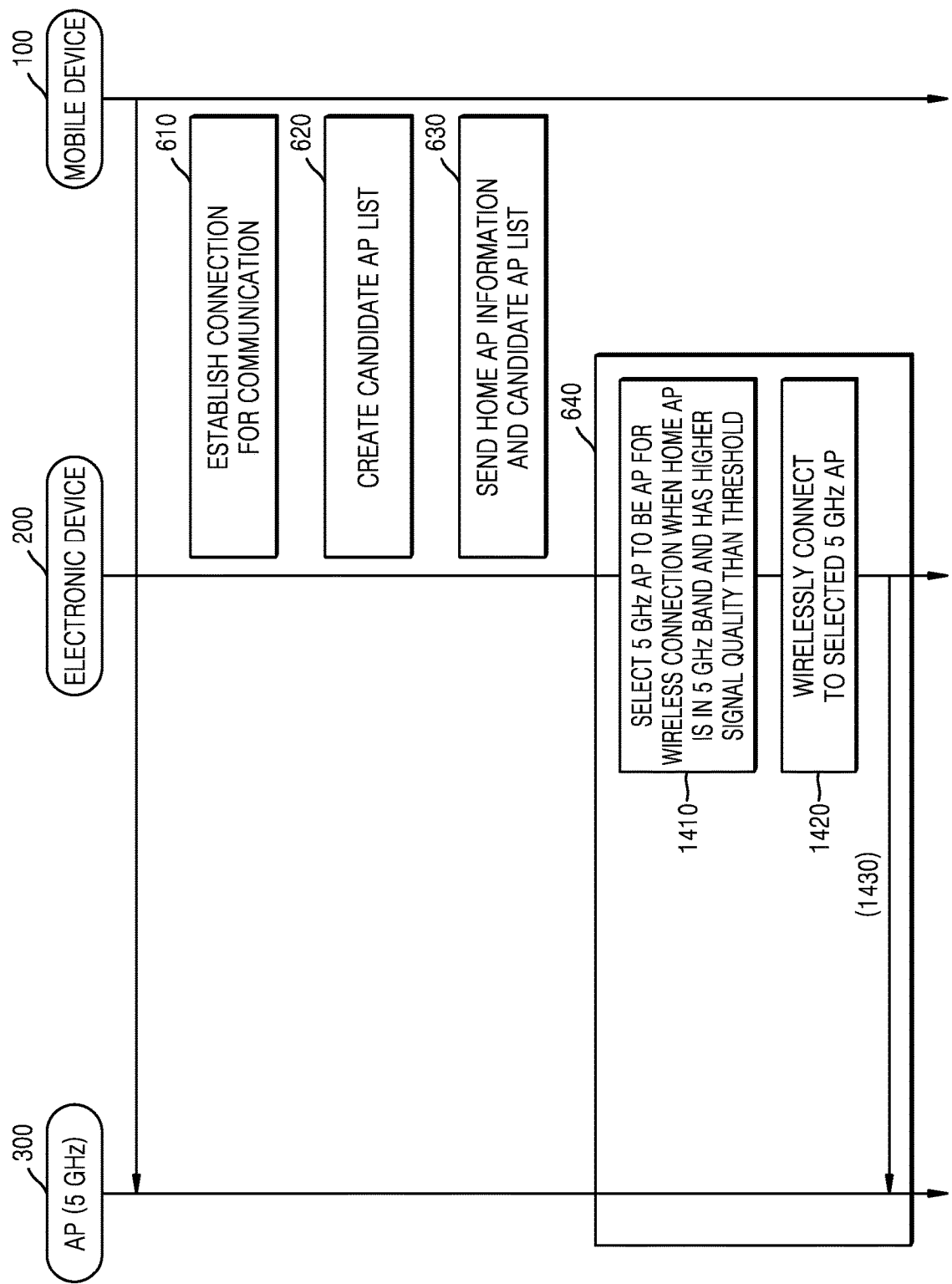
FIG. 14 shows details of an operation of an electronic device of selecting and connecting to a candidate AP to be wirelessly connected, according to an embodiment of the disclosure.

FIG. 14 shows details of the operation 640 of selecting and wirelessly connecting to a candidate AP by the electronic device 200, according to an embodiment of the disclosure.

Referring to FIG. 14, in operation 1410, the electronic device 200 selects the home AP for wireless connection when the home AP has the 5 GHz band and higher signal quality than a threshold. The electronic device 200 may determine the home AP and the band of the home AP based on the home AP information received from the mobile device 100.

In operation 1420, the electronic device 200 performs wireless connection to the selected 5 GHz AP.

In operation 1430, the electronic device 200 tries making wireless connection to the selected 5 GHz AP by transmitting the password to the AP. The electronic device 200 may determine a password of the home AP based on the home AP information received from the mobile device 100.

When the home AP is in the 5 GHz and has good signal quality, wireless connection may be made to the 5 GHz home AP in both cases that the home AP is the single band AP and that the home AP is the multiband AP that also supports the 2.4 GHz band.

Accordingly, in the example of FIG. 14, the electronic device 200 may be equally connected to a 5 GHz AP, which is the home AP connected to the mobile device 100.

Figure 15:
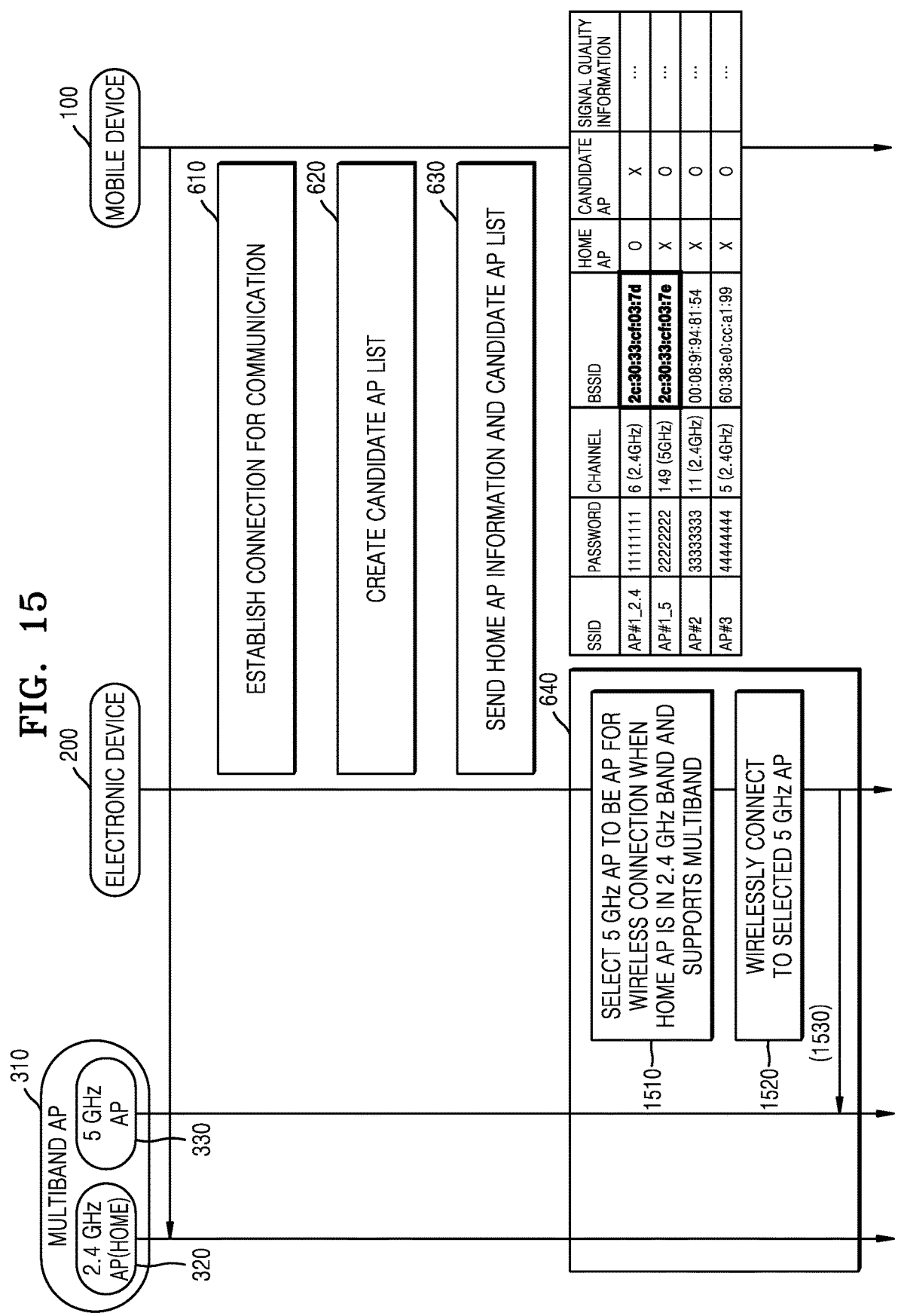
FIG. 15 shows details of an operation of an electronic device of selecting and connecting to a candidate AP to be wirelessly connected, according to another embodiment of the disclosure.

FIG. 15 shows details of the operation 640 of selecting and wirelessly connecting to a candidate AP by the electronic device 200, according to another embodiment of the disclosure.

Referring to FIG. 15, in operation 1510, the electronic device 200 selects the 5 GHz AP for wireless connection when the home AP is in the 2.4 GHz band and supports multiband.

The electronic device 200 may determine whether the home AP supports multiband based on information about the list of candidate APs received from the mobile device 100.

The electronic device 200 may check the BSSIDs 1034 of candidate APs included on the list of candidate APs 1030, compare them with the BSSID of a home AP 320 connected to the mobile device 100, and when there is a candidate AP having a BSSID matched in more than certain bytes, e.g., 5 bytes or more, with the BSSID of the home AP, determine the home AP as belonging to a multiband AP 310. The electronic device 200 may then select a candidate AP 330 having the 5 GHz band in the multiband AP 310 for wireless connection.

Turning back to FIG. 10C, among the list of candidate APs 1030, a second AP has a BSSID matched in 5 bytes or more with the BSSID of the home AP, and the first and second APs end with different values "7d" and "7e", respectively. Accordingly, the electronic device 200 may determine that the home AP is one AP belonging to the multiband AP that supports both the 2.4 GHz band and 5 GHz band.

In operation 1520, the electronic device 200 performs wireless connection to the selected 5 GHz AP.

In operation 1530, the electronic device 200 transmits password "222222222" to the 5 GHz AP to try making wireless connection not to the 2.4 GHz AP currently connected to the mobile device 100 but to the 5 GHz AP.

In the example shown in FIG. 15, the mobile device 100 may then be connected to the 2.4 GHz AP 320 in the multiband AP 310 while the electronic device 200 may be connected to the 5 GHz AP 330 in the multiband AP 310.

FIG. 16 shows details of the operation 640 of selecting and wirelessly connecting to a candidate AP by the electronic device 200, according to another embodiment of the disclosure.

Referring to FIG. 16, in operation 1610, the electronic device 200 selects a candidate AP with better signal quality to make wireless connection from among candidate APs when the home AP and the multiband AP both have poor signal quality.

For example, based on the list of candidate APs 1030 as shown in FIG. 10C, the electronic device 200 may select a candidate AP with best signal quality from among the candidate APs other than the home AP and the multiband AP when the home AP has poor signal quality and the 5 GHz AP of the multiband AP has also poor signal quality. In the example of FIG. 10C, a candidate AP that has better signal quality may be selected from among candidate APs, AP #2 and AP #3.

In operation 1620, the electronic device 200 performs wireless connection to the selected AP.

In operation 1630, the electronic device 200 tries wireless connection to the selected AP by transmitting a password corresponding to the selected AP to the selected AP.

Accordingly, in the example of FIG. 16, the electronic device 200 may be connected to one of the candidate APs other than the home AP 320 connected to the mobile device 100 or the multiband AP 310.

The operation methods of the mobile device and electronic device according to embodiments of the disclosure may be implemented in program instructions which are executed by various computing devices and recorded in computer-readable media. The computer-readable media may include program instructions, data files, data structures, etc., separately or in combination. The program instructions recorded on the computer-readable media may be designed and configured specially for the disclosure, or may be well-known to people having ordinary skill in the art of computer software. Examples of the computer readable recording medium include read-only memories (ROMs), random-access memories (RAMs), Compact Disc (CD)-ROMs, magnetic tapes, floppy disks, optical data storage devices, etc. The computer readable recording medium can also be distributed over network-coupled computer systems so that the computer readable code is stored and executed in a distributed fashion. Examples of the program instructions include not only machine language codes but also high-level language codes which are executable by various computing means using an interpreter.

According to embodiments of the disclosure, an electronic device may make connection to a wireless AP with best performance by automatic Wi-Fi connection through a mobile device.

Several embodiments of the disclosure have been described, but it will be understood that various modifications can be made without departing the scope of the disclosure. Thus, it will be apparent to those ordinary skilled in the art that the disclosure is not limited to the embodiments of the disclosure described, but can encompass not only the appended claims but the equivalents.

What is claimed is:

1. A mobile device comprising:
   a communication interface;
   a memory storing one or more instructions; and
   a processor configured to execute the one or more instructions stored in the memory to:
   connect, through the communication interface, to an electronic device that is to be wirelessly connected to an access point (AP),
   obtain an AP list including one or more APs with which the mobile device has a history of being connected,
   identify one or more selected APs from the AP list including the one or more APs having the history of being connected to the mobile device as candidate APs, and create a candidate AP list including information about the one or more selected APs identified as the candidate APs, and
   transmit, to the electronic device, the candidate AP list and information about a home AP to which the mobile device is currently connected.

2. The mobile device of claim 1, wherein the processor is further configured to:
   receive a list of scanned APs including one or more scanned APs from the electronic device performing wireless fidelity (Wi-Fi) channel scanning, for the candidate list, and
   compare the AP list including one or more APs having the history of being connected with the list of scanned APs including one or more scanned APs and identify one or more matched APs as the candidate APs.

3. The mobile device of claim 1, wherein the processor is further configured to:
   create a list of scanned APs including one or more APs scanned by performing Wi-Fi channel scanning, for the candidate list, and
   compare the AP list having the history of being connected with the list of scanned APs and identify one or more matched APs as the candidate APs.

4. The mobile device of claim 1, wherein the processor is further configured to:
   identify, from among the AP list including the one or more APs having the history of being connected, one or more APs having equal or higher wireless communication quality than a threshold as the candidate APs, and
   create the candidate AP list to include information about the identified one or more APs having equal or higher wireless communication quality than the threshold.

5. The mobile device of claim 1, wherein the processor is further configured to:
   select one or more candidate APs from the candidate AP list according to predefined priorities, and
   create an adjusted candidate AP list including the one or more selected candidate APs according to the predefined priorities.

6. The mobile device of claim 1, wherein the candidate AP list and the information about the home AP transmitted to the electronic device comprise:
   a basic service set identifier (BSSID);
   a channel number, and a password for each AP; and
   information about whether a respective AP is the home AP.

7. The mobile device of claim 6, wherein the candidate AP list and the information about the home AP transmitted to the electronic device further comprise information about wireless communication quality of each AP.

8. An electronic device comprising:
   a communication interface;
   a memory storing one or more instructions; and
   a processor configured to execute the one or more instructions stored in the memory to:
   connect to a mobile device through the communication interface,
   receive, from the mobile device, a candidate access point (APs) list including information about one or more candidate APs selected from among one or more APs with which the mobile device has a history of being connected and information about a home AP currently connected to the mobile device,
   select an AP to which the electronic device is to be wirelessly connected, based on the candidate APs list and the information about the home AP received from the mobile device, and
   wirelessly connect to the selected AP.

9. The electronic device of claim 8, wherein the processor is further configured to:
   create a list of scanned APs including one or more scanned APs by performing Wi-Fi channel scanning and transmit the list of scanned APs to the mobile device, and
   wherein the candidate AP list received from the mobile device comprises one or more APs as the candidate APs, which match the one or more APs with which the mobile device has of the history of being connected and the list of scanned APs.

10. The electronic device of claim 8, wherein the candidate AP list received from the mobile device comprises one or more APs as the candidate APs, which match one or more APs with which the mobile device has the history of being connected and one or more APs scanned by the mobile device.

11. The electronic device of claim 8, wherein the candidate AP list and the information about the home AP received from the mobile device comprise:
a basic service set identifier (BSSID);
a channel number, and a password for each AP; and
information about whether a respective AP is the home AP.

12. The electronic device of claim 8, wherein the processor is further configured to:
for selecting the AP to which the electronic device is to be wirelessly connected, identify the home AP as the selected AP to be wirelessly connected when the home AP has a 5 GHz band and equal or higher wireless communication quality than a threshold based on the candidate AP list and the information about the home AP received from the mobile device.

13. The electronic device of claim 8, wherein the processor is further configured:
for selecting the AP to which the electronic device is to be wirelessly connected, identify, from among the candidate AP list, a candidate AP having a 5 GHz band of the home AP as the selected AP to be wirelessly connected, when the home AP is in a 2.4 GHz band and corresponds to a multiband AP based on the candidate AP list and the information about the home AP received from the mobile device.

14. The electronic device of claim 13, wherein the processor is further configured to:
compare BSSIDs of the one or more candidate APs included in the candidate AP list with a BSSID of the home AP, and when there is a match in a certain number of bytes or more, identify that the home AP is the multiband AP.

15. The electronic device of claim 12 or claim 13, wherein the processor is further configured to:
for selecting the AP to which the electronic device is to be wirelessly connected, select a candidate AP from among the candidate AP list as the AP to be wirelessly connected, based on wireless communication quality information, when the home AP or the candidate AP having the 5 GHz band of the home AP has lower wireless communication quality than a threshold based on the candidate AP list and the home AP information received from the mobile device.

16. An operation method of a mobile device, the operation method comprising:
connecting to an electronic device to be wirelessly connected to an access point (AP);
obtaining an AP list including one or more APs with which the mobile device has a history of being connected;
determining, as candidate APs, one or more selected APs from among the AP list having the history of being connected to the mobile device, and creating a candidate AP list including information about the determined one or more candidate APs; and
transmitting, to the electronic device, the created candidate AP list and information about a home AP to which the mobile device is currently connected.

17. The operation method of claim 16, further comprising:
receiving, from the electronic device, a list of scanned APs including one or more scanned APs from the electronic device performing wireless fidelity (Wi-Fi) channel scanning, for the candidate list, and
comparing the AP list including one or more APs having the history of being connected with the list of scanned APs including one or more scanned APs and determining one or more matched APs as the candidate APs.

18. An operation method of an electronic device, the operation method comprising:
connecting with a mobile device through a communication interface;
receiving, from the mobile device, a candidate AP list including information about one or more candidate APs selected from among one or more APs with which the mobile device has a history of being connected and information about a home AP currently connected to the mobile device;
selecting an AP to which the electronic device is be wirelessly connected, based on the candidate AP list and the information of the home AP received from the mobile device; and
wirelessly connecting to the selected AP.

19. The operation method of claim 18, further comprising:
creating a list of scanned APs including one or more scanned APs by performing Wi-Fi channel scanning, and transmitting the list of scanned APs to the mobile device,
wherein the candidate AP list received from the mobile device comprises one or more APs as candidate APs, which match the one or more APs with which the mobile device has a history of being connected and the list of scanned APs.

20. A computer program product including a non-transitory computer-readable recording medium having a program stored thereon to perform an operation method of a mobile device, the operation method comprising:
connecting to an electronic device to be wirelessly connected to an access point (AP);
obtaining an AP list including one or more APs with which the mobile device has a history of being connected;
determining, as candidate APs, one or more selected APs from among the AP list including the one or more APs with which the mobile device has the history of being connected, and creating a candidate AP list including information about the determined candidate APs; and
transmitting, to the electronic device, the created candidate AP list and information about a home AP to which the mobile device is currently connected.

* * * * *